Dec. 4, 1951     T. L. DIMOND ET AL     2,577,609
CALL DATA RECORDING AUTOMATIC TELEPHONE SYSTEM
Filed May 5, 1949     46 Sheets-Sheet 2

INVENTORS
T. L. DIMOND
C. A. WINGARDNER
BY
ATTORNEY

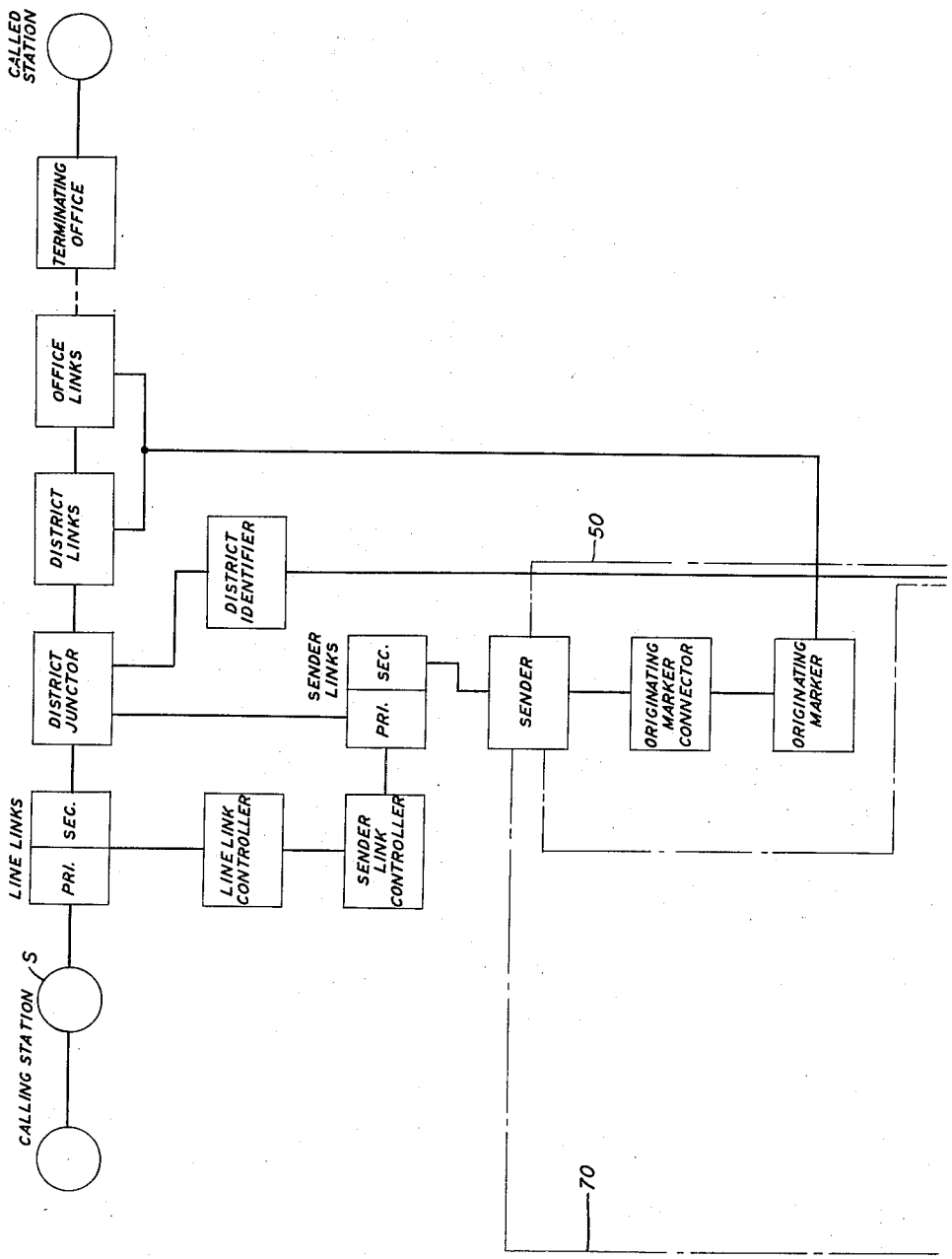

Dec. 4, 1951 T. L. DIMOND ET AL 2,577,609
CALL DATA RECORDING AUTOMATIC TELEPHONE SYSTEM
Filed May 5, 1949 46 Sheets-Sheet 15

INVENTORS T. L. DIMOND
C. A. WINGARDNER
BY
ATTORNEY

INVENTORS T. L. DIMOND
C. A. WINGARDNER

Dec. 4, 1951 T. L. DIMOND ET AL 2,577,609
CALL DATA RECORDING AUTOMATIC TELEPHONE SYSTEM
Filed May 5, 1949 46 Sheets-Sheet 18

INVENTORS T. L. DIMOND
C. A. WINGARDNER
BY
ATTORNEY

Dec. 4, 1951 T. L. DIMOND ET AL 2,577,609
CALL DATA RECORDING AUTOMATIC TELEPHONE SYSTEM
Filed May 5, 1949 46 Sheets-Sheet 20

INVENTORS T. L. DIMOND
C. A. WINGARDNER
BY
ATTORNEY

Dec. 4, 1951 T. L. DIMOND ET AL 2,577,609
CALL DATA RECORDING AUTOMATIC TELEPHONE SYSTEM
Filed May 5, 1949 46 Sheets-Sheet 22

INVENTORS T. L. DIMOND
C. A. WINGARDNER
BY
ATTORNEY

INVENTORS T. L. DIMOND
C. A. WINGARDNER
BY
ATTORNEY

Dec. 4, 1951  T. L. DIMOND ET AL  2,577,609
CALL DATA RECORDING AUTOMATIC TELEPHONE SYSTEM
Filed May 5, 1949  46 Sheets-Sheet 27

INVENTORS T. L. DIMOND
C. A. WINGARDNER
BY
ATTORNEY

Dec. 4, 1951  T. L. DIMOND ET AL  2,577,609
CALL DATA RECORDING AUTOMATIC TELEPHONE SYSTEM
Filed May 5, 1949  46 Sheets-Sheet 29

INVENTORS T. L. DIMOND
C. A. WINGARDNER
BY
ATTORNEY

Dec. 4, 1951 T. L. DIMOND ET AL 2,577,609
CALL DATA RECORDING AUTOMATIC TELEPHONE SYSTEM
Filed May 5, 1949 46 Sheets-Sheet 30
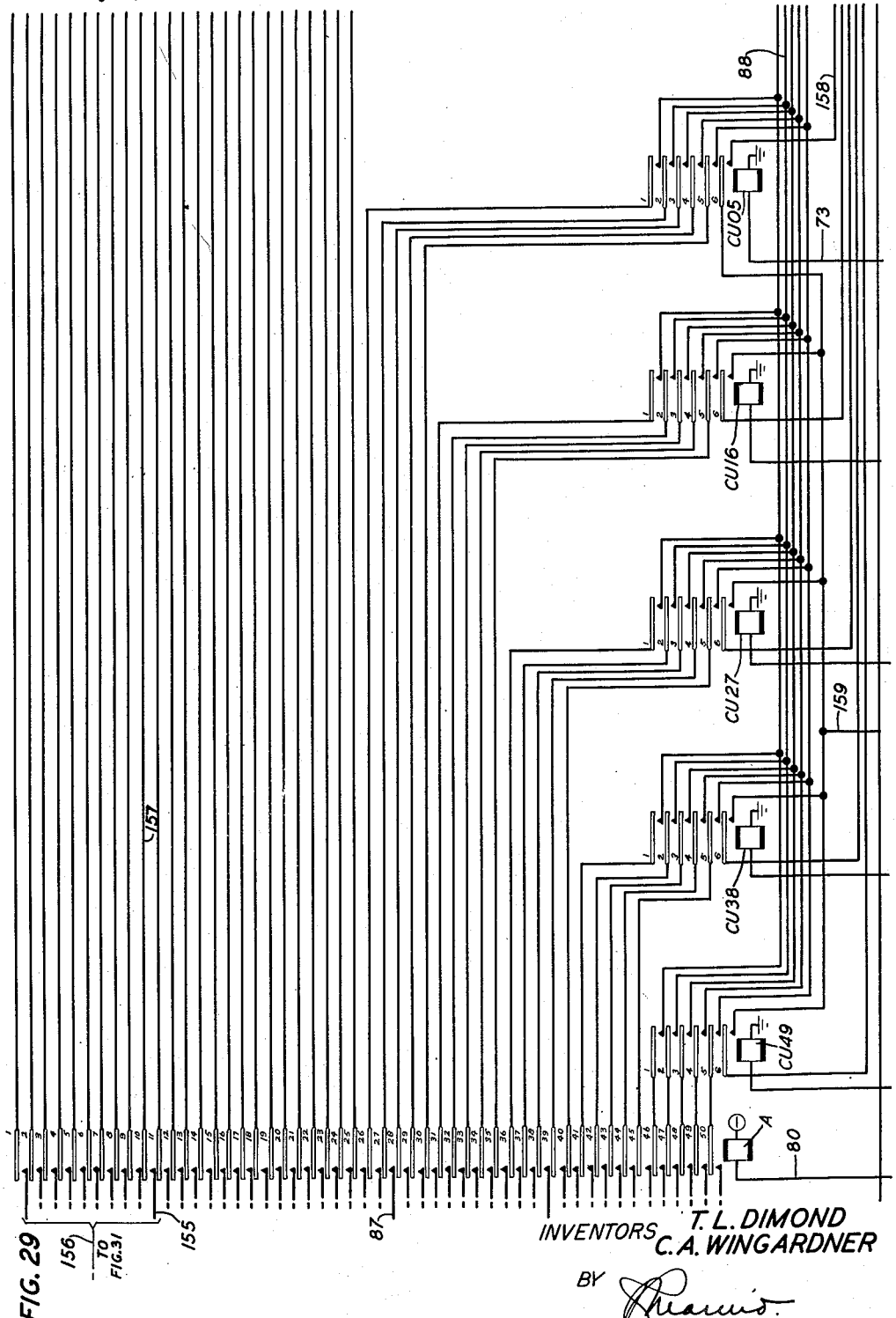
INVENTORS T. L. DIMOND
C. A. WINGARDNER
BY 
ATTORNEY Dec. 4, 1951 T. L. DIMOND ET AL 2,577,609
CALL DATA RECORDING AUTOMATIC TELEPHONE SYSTEM
Filed May 5, 1949 46 Sheets-Sheet 31

INVENTORS T. L. DIMOND
C. A. WINGARDNER
BY
ATTORNEY

Dec. 4, 1951  T. L. DIMOND ET AL  2,577,609
CALL DATA RECORDING AUTOMATIC TELEPHONE SYSTEM
Filed May 5, 1949  46 Sheets-Sheet 33

INVENTORS T. L. DIMOND
C. A. WINGARDNER
BY
ATTORNEY

Dec. 4, 1951  T. L. DIMOND ET AL  2,577,609
CALL DATA RECORDING AUTOMATIC TELEPHONE SYSTEM
Filed May 5, 1949  46 Sheets-Sheet 43

INVENTORS T. L. DIMOND
C. A. WINGARDNER
BY
ATTORNEY

Dec. 4, 1951  T. L. DIMOND ET AL  2,577,609
CALL DATA RECORDING AUTOMATIC TELEPHONE SYSTEM
Filed May 5, 1949  46 Sheets-Sheet 46

INVENTORS T. L. DIMOND
C. A. WINGARDNER
BY
ATTORNEY

Patented Dec. 4, 1951

2,577,609

UNITED STATES PATENT OFFICE 2,577,609

CALL DATA RECORDING AUTOMATIC TELEPHONE SYSTEM

Thomas L. Dimond, Rutherford, and Charles A. Wingardner, Chatham, N. J., assignors to Bell Telephone Laboratories, Incorporated, New York, N. Y., a corporation of New York Application May 5, 1949, Serial No. 91,542

6 Claims. (Cl. 179—7)

This invention relates to call data recording telephone systems.

In telephone systems where call data are recorded for billing purposes, one of the items which it is necessary to record is an identification of the calling line or, in the case of a party line, of the calling station, in order that the subscriber to whom the call should be charged can be determined. Where cross-bar switching equipment is used, the location of the line-link switch contacts of a calling line is readily obtained and is an identification of said line. For billing purposes, however, it is not a very satisfactory identification since, in order to determine the subscriber to whom the call should be charged, the directory number of the calling line or, in the case of a party line, of the calling station, is needed.

Means for deriving the directory number of a line from indications of the location of its line-link switch contacts in certain types of telephone systems are known, for example, the system shown in the copending application of H. D. Cahill et al., Serial No. 57,388, filed October 29, 1948. But there are other types of systems, however, to which these known means are not well adapted. The present invention discloses a novel data-recording telephone system of the type disclosed in the copending application of W. W. Carpenter and R. E. Collis, Serial No. 759,402, filed July 7, 1947, a feature of which is a means for registering the particular numbers used in that system to identify the line-link switches, and means for deriving from those numbers the directory numbers of calling lines or stations for recording.

Other features of the invention are a means for selecting one of a number of inductive translators in accordance with the numbers of the line-link switch contacts of the calling line and of the column of switches in which said contacts are located, and a means for selecting and energizing a wire in said selected translator in accordance with the numbers of said line-link switch contacts and of the switch having those contacts.

These and other features of the invention will be more apparent from the accompanying description, the appended claims, and the drawing, in which:

Fig. 2A shows, in diagrammatic form, the switching equipment;

Figs. 4 through 35 show the transverter;

Figure 1:
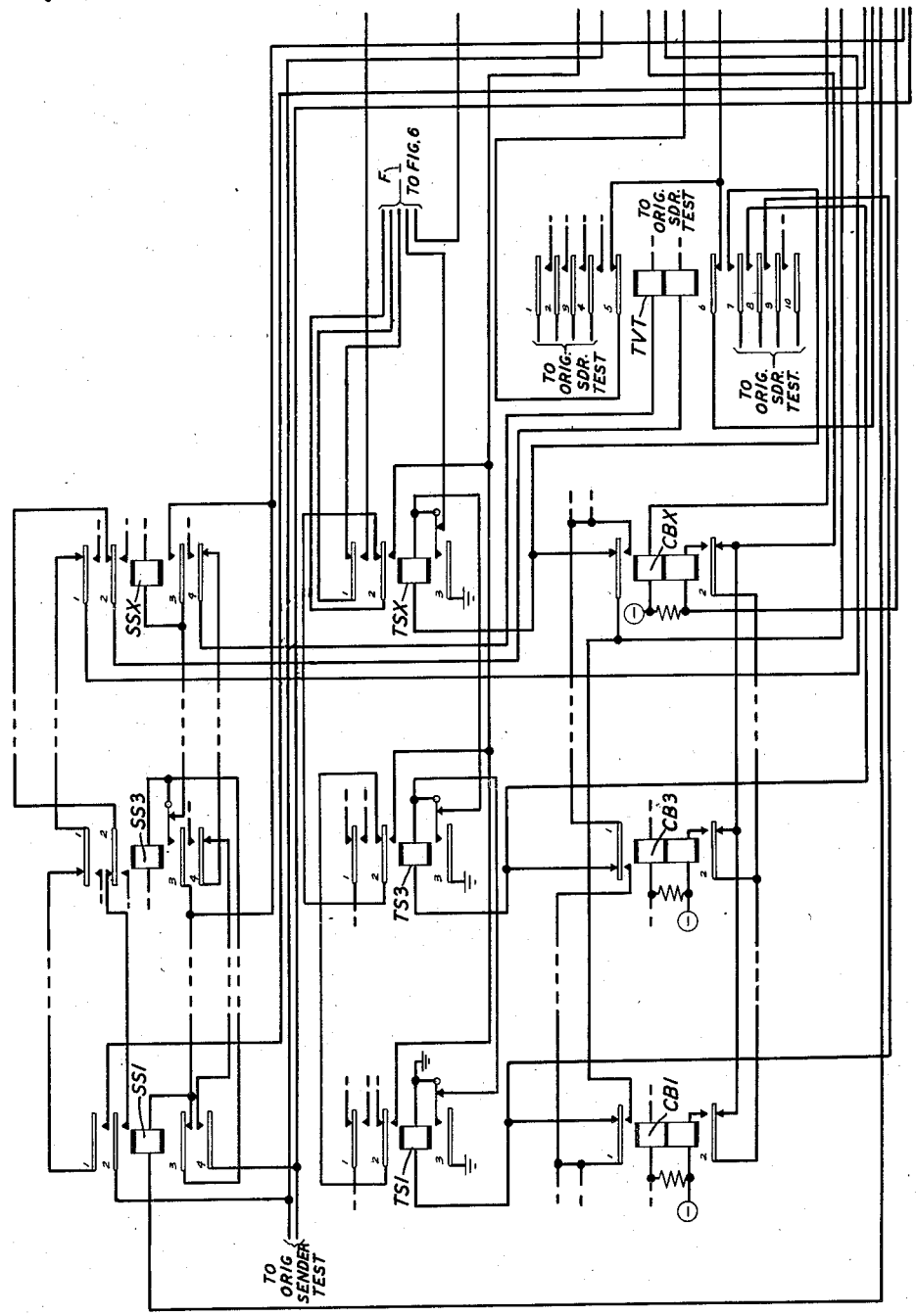
Figs. 1, 2 and 3 show the transverter connector.

In the present embodiment of the invention, the elements employed are, with the exception of the transverter and the translator, the same as the corresponding elements disclosed in the above-mentioned copending application of W. W. Carpenter and R. E. Collis. Since the complete telephone system is extensive, only the transverter, the transverter connector, and the translator are shown in detail herein, and reference may be had to said copending application for a more complete disclosure of the elements of the system disclosed herein in diagrammatic form only.

As explained in the above-mentioned copending application of W. W. Carpenter and R. E. Collis, the transverter is an element which gathers and registers the data to be recorded in connection with a telephone call, and controls the recording equipment to record the data in convenient form. Part of the data registered by the transverter is a series of numbers identifying the particular contacts of the particular line-link switch to which the calling line is connected. In the present invention, the transverter uses this data to select a particular translator and passes information to the selected translator which enables the latter to select a particular wire corresponding to the calling line or the calling station. Energizing this wire signals back to the transverter the directory number of the calling line or station.

When there is but one station on a line, there is but one directory number, which may be considered the number of the line. When there are two stations on a line, each station has its own directory number. Separate translators are provided for numbers assigned to ring-party stations and for those assigned to tip-party stations.

The switching equipment for establishing the connections between subscribers, and the recording equipment of the present embodiment of the invention, are described in detail in the above-mentioned copending application of W. W. Carpenter and R. E. Collis but, for a complete understanding of the invention, the manner in which this equipment functions will be also described herein. Referring to Fig. 2A, when a call is originated at a subscriber's station, such as station S, the line of said station is extended by a line link to a district junctor, and a sender is connected by a sender link through the district junctor to said line. The subscriber at the calling station, upon receipt of dial tone, dials the called-station designation which is registered in the sender. The primary line-link switches, which form part of the line links and to one contact group of which a line is connected, are arranged in numbered columns, the switches and the vertical files of contact groups being also numbered. The line-link controller, in addition to controlling the line links to extend a calling line, also indicates to the sender the number of the column, the number of the switch, and the number of the vertical file to which the calling line is connected and the class of said line, these items being registered by the sender. The sender also tests the calling line and registers an indication of the character of the calling station, whether ring-party or tip-party, the stations on individual lines being considered ring-party stations. An originating marker is connected to the sender by the originating marker connector and, in accordance with the place called and the class of the calling line, determines whether or not a charge should be made for the call and, if a charge should be made, determines the rate of charge and the type of record required, indications of which are then registered in the sender.

The originating marker then, in accordance with the office designation of the called station, controls the district and office links to extend the calling line to the terminating office so indicated, and the sender controls the equipment at said terminating office to further extend the calling line to the called line. When the originating marker and the sender have completed their functions, they are severally disconnected for use with other calls, and the called station is rung by the terminating office equipment.

If a charge is to be made for the call, before the sender is disconnected a transverter is connected to it, and the call data, which were registered in the sender, are registered in the transverter. The transverter then selects an appropriate recorder having a continuous medium and causes the call data to be recorded thereby, in code and in a particular form, together with indications of the character of the data recorded.

When the subscriber at the called station answers, the usual charge relay in the district junctor operates after a suitable interval, indicating that a talking connection has been established and that, if the call is of a type for which a charge should be made if completed, such charge should be made. The same recorder is then caused to record an indication of concurrent time together with the district junctor number obtained from the district identifier. When the connection is terminated, the same recorder records an indication of concurrent time and the district junctor number.

Thus, three entries on the medium of the recorder are made for each completed call, which are usually interspersed among the entries of other calls. The three entries for any one call can always be recognized, however, as three successive entries having the same district junctor number, which is recorded in each entry, while the presence of one entry without corresponding answer and disconnect entries shows a call that was not completed.

The master timing circuit causes each recorder to record a time entry at the beginning of each hour. From these time entries and the time indications in the answer and disconnect entries, the elapsed conversation time of each completed call can be determined.

In the system shown in the above-mentioned copending application of W. W. Carpenter and R. E. Collis, the first entry relating to a call contains the numbers of the line-link switch column, the switch, and the vertical file (contact group) of the switch to which the calling line is connected, and an indication of the character of the calling station. From these the name of the subscriber to whom the call should be charged can be determined, but only by first determining the directory number of the line or station indicated by the data.

In the present invention, the column number and the vertical file number are registered in the transverter, together with an indication of the character of the calling station. These enable the transverter to select the translator in which there is the particular wire from which the directory number of the line or station indicated can be obtained. Then the switch number and the vertical file number are registered in the translator and from these the translator selects and energizes the particular wire. This double registration is employed to minimize the amount of apparatus required. The number indicated by the energization of the wire in the translator is registered in the transverter and, when the transverter controls the recorder to record the first entry relating to the call, it is this number, which is the directory number of the calling line or station, that is recorded rather than the column number, the switch number, and the vertical file number.

Having described the character and the functioning of the invention and all the operations thereof except the registering of the switch data in the transverter and in the translator and the determination of the directory number therefrom, the same being fully described in the aforesaid copending application of W. W. Carpenter and R. E. Collis, it is believed that a clear understanding of the invention will be obtained, and undue repetition avoided, if only the operations which differ from those of the aforesaid copending application are described in detail herein. Reference may be had to said copending application for a more complete description of the operations mentioned but not herein described in detail.

Figure 2:
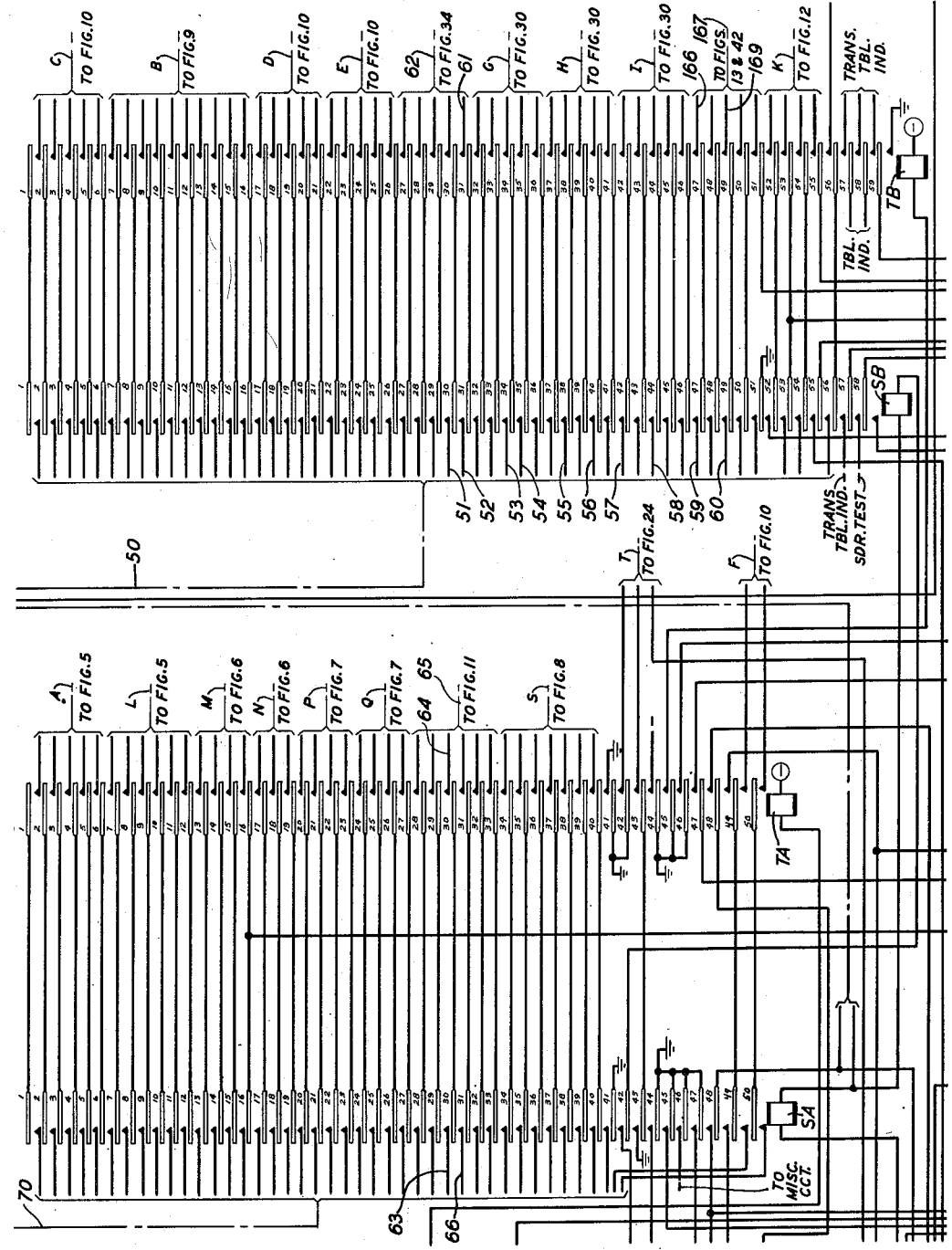
Figure 3:
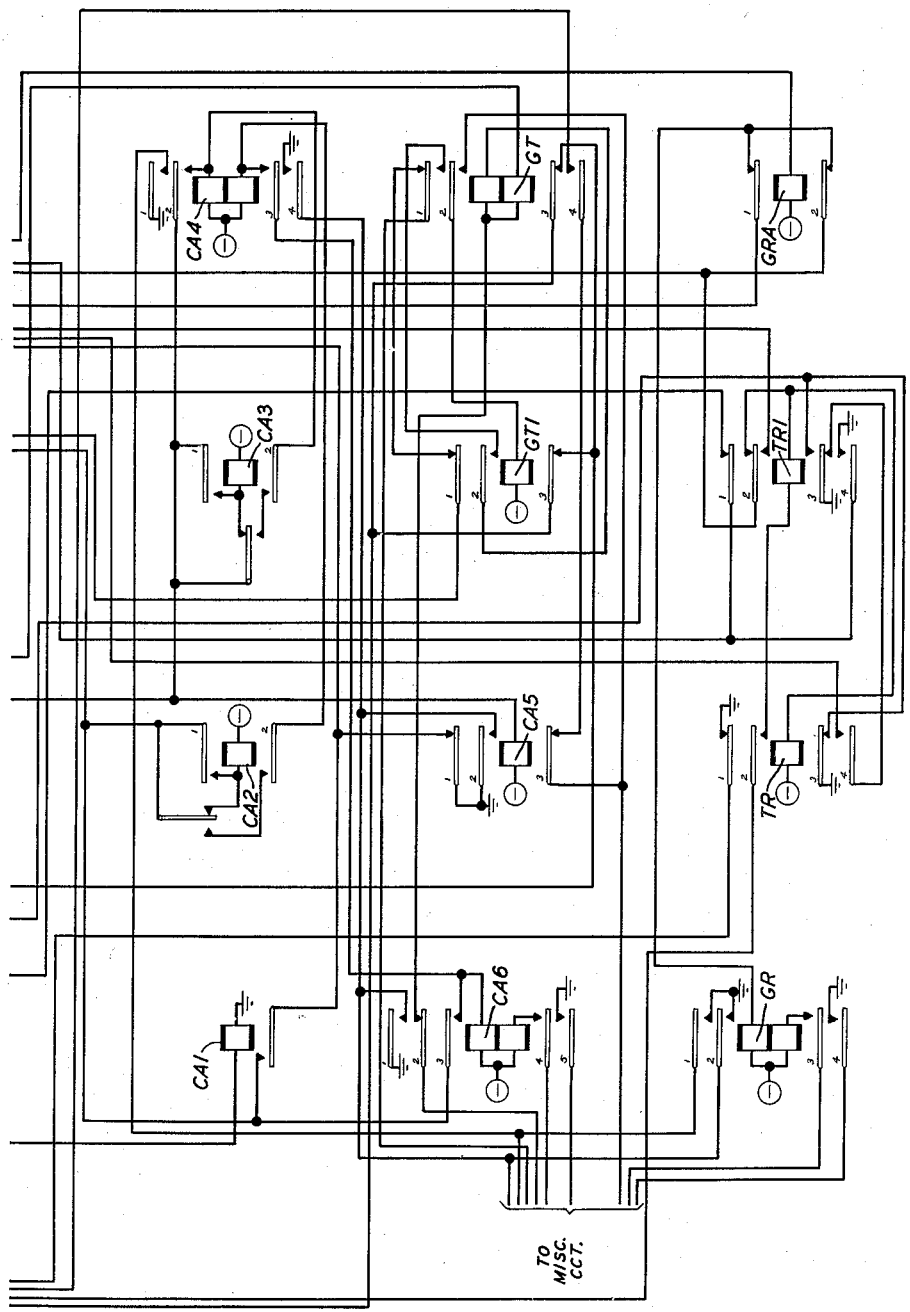
Figure 4:
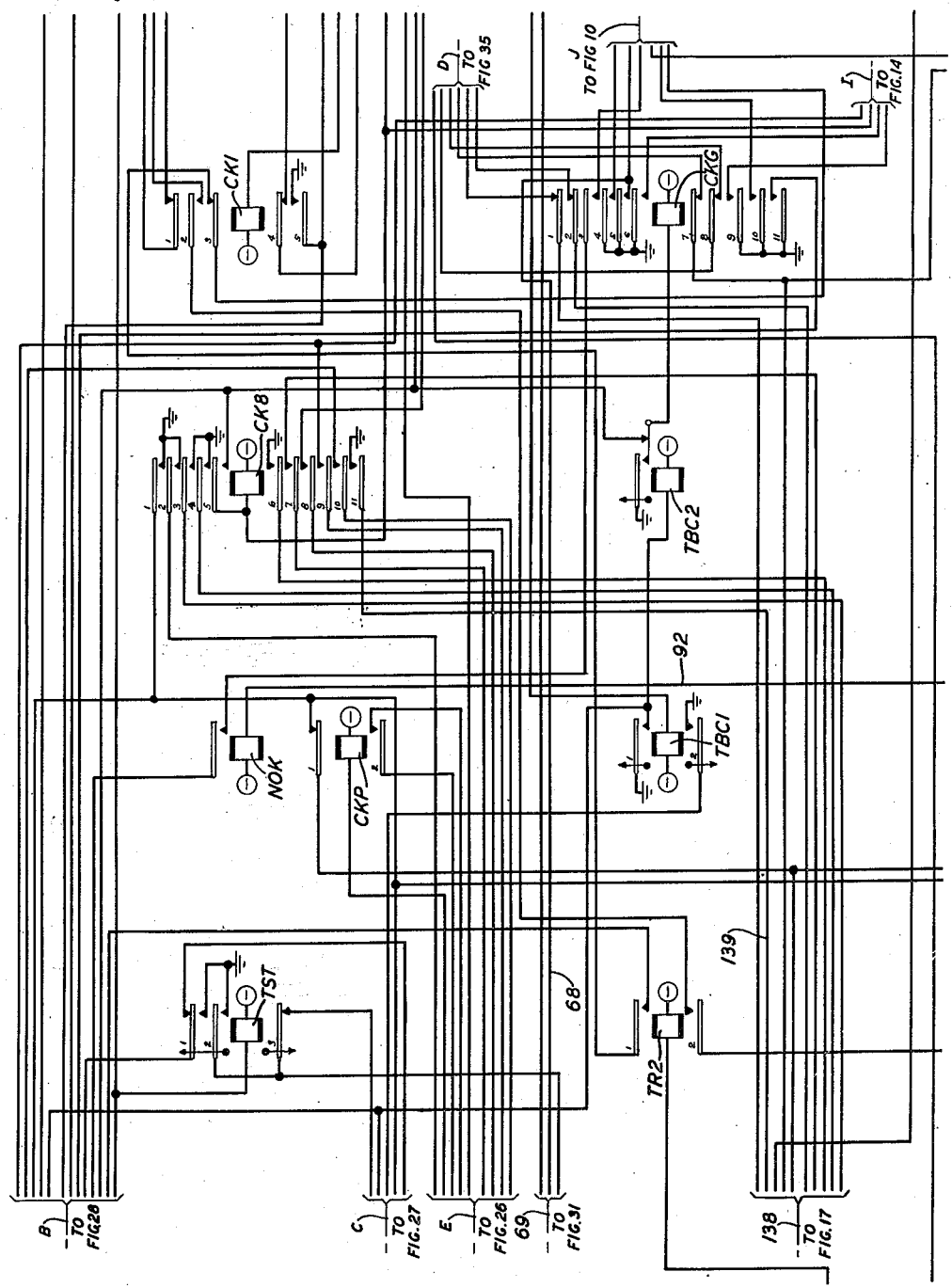
Figure 5:
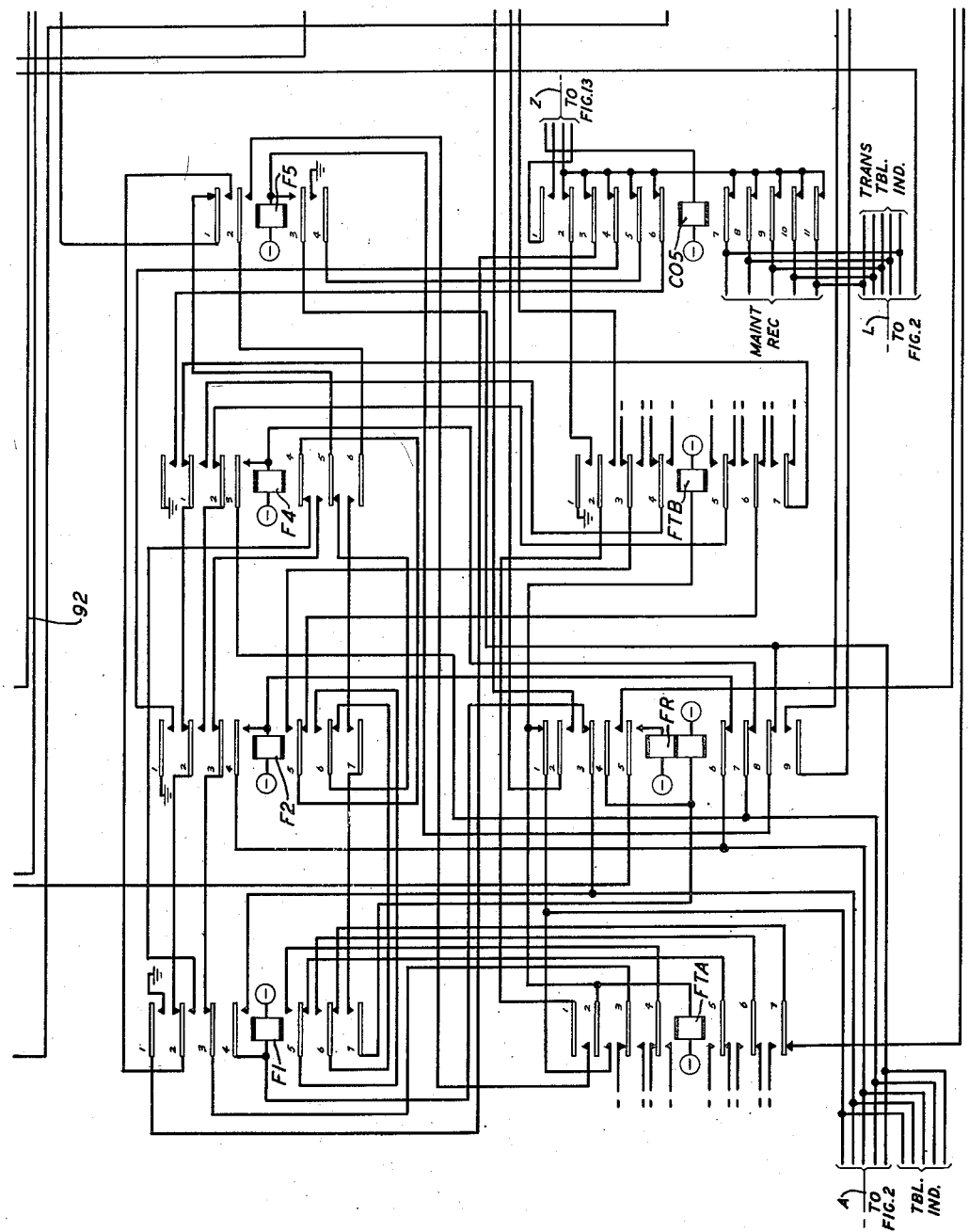
Figure 6:
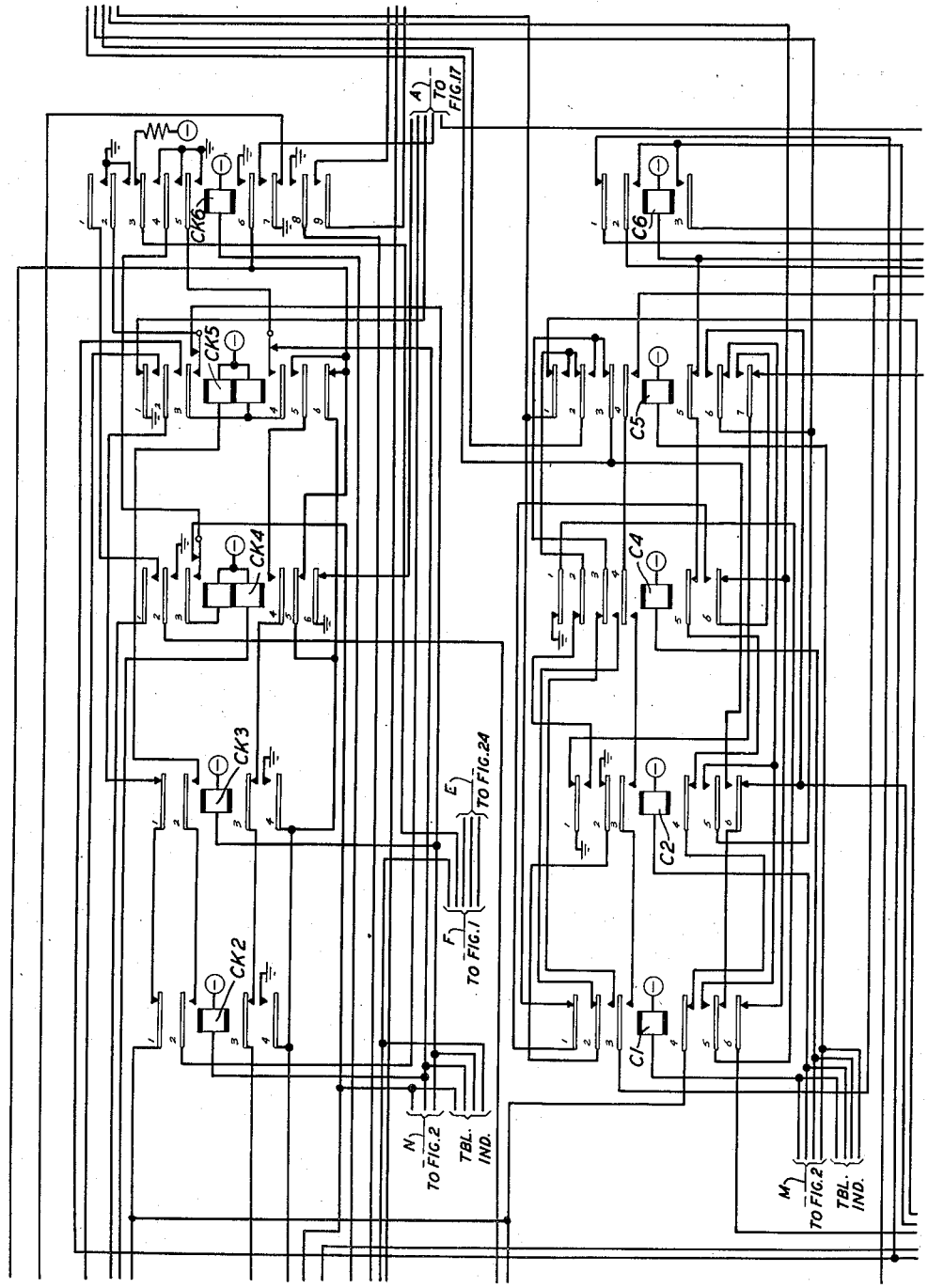
Figure 7:
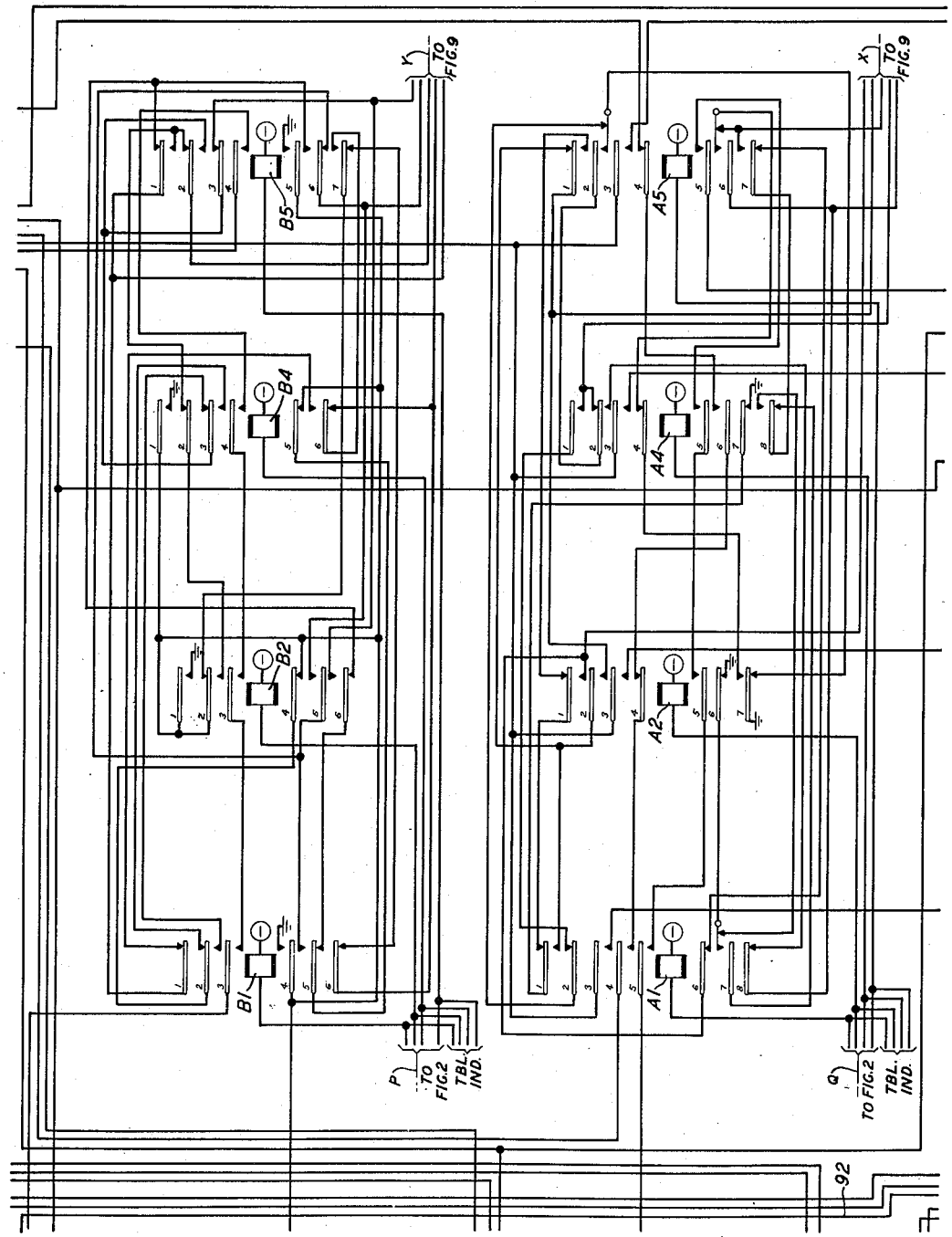
Figure 8:
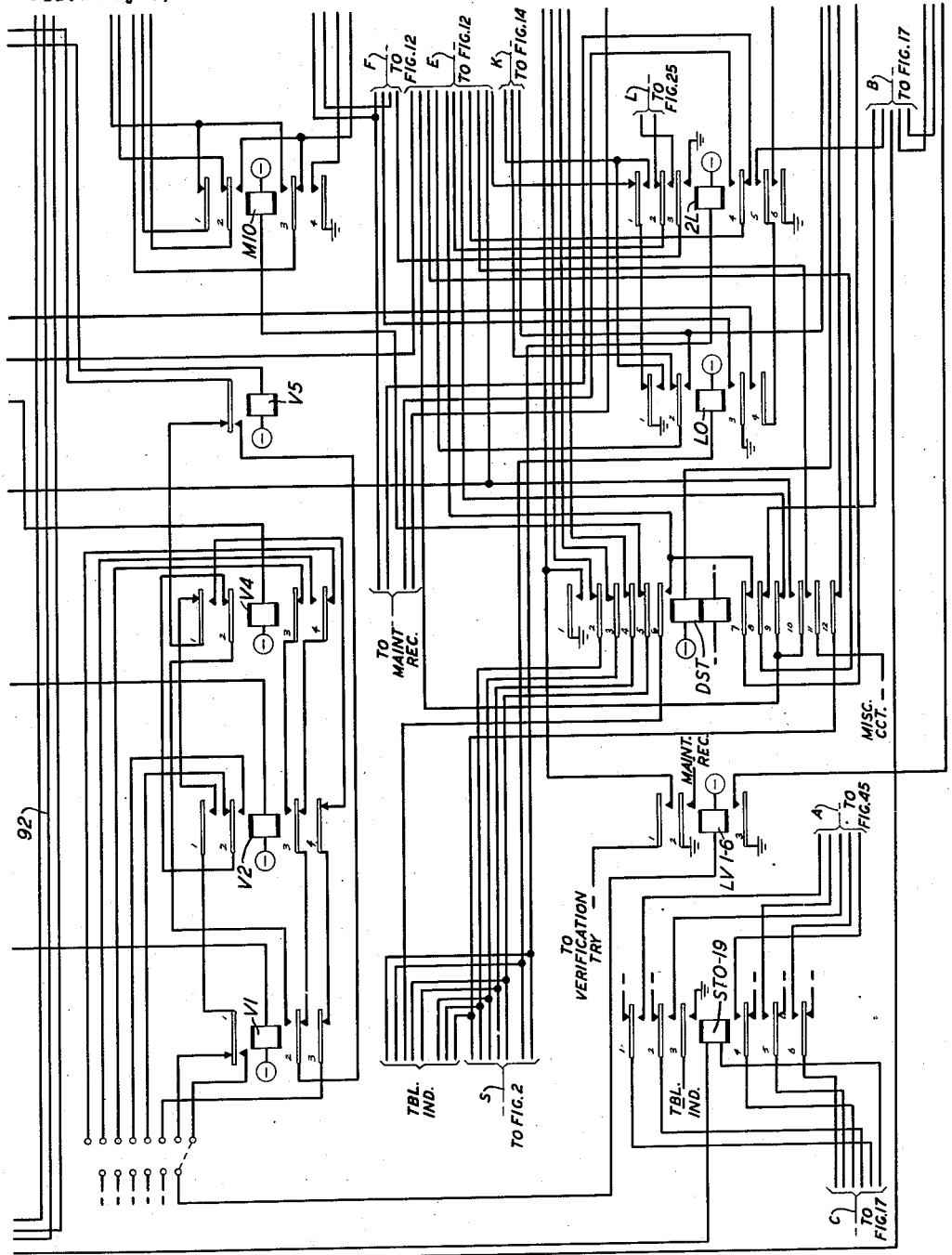
Figure 9:
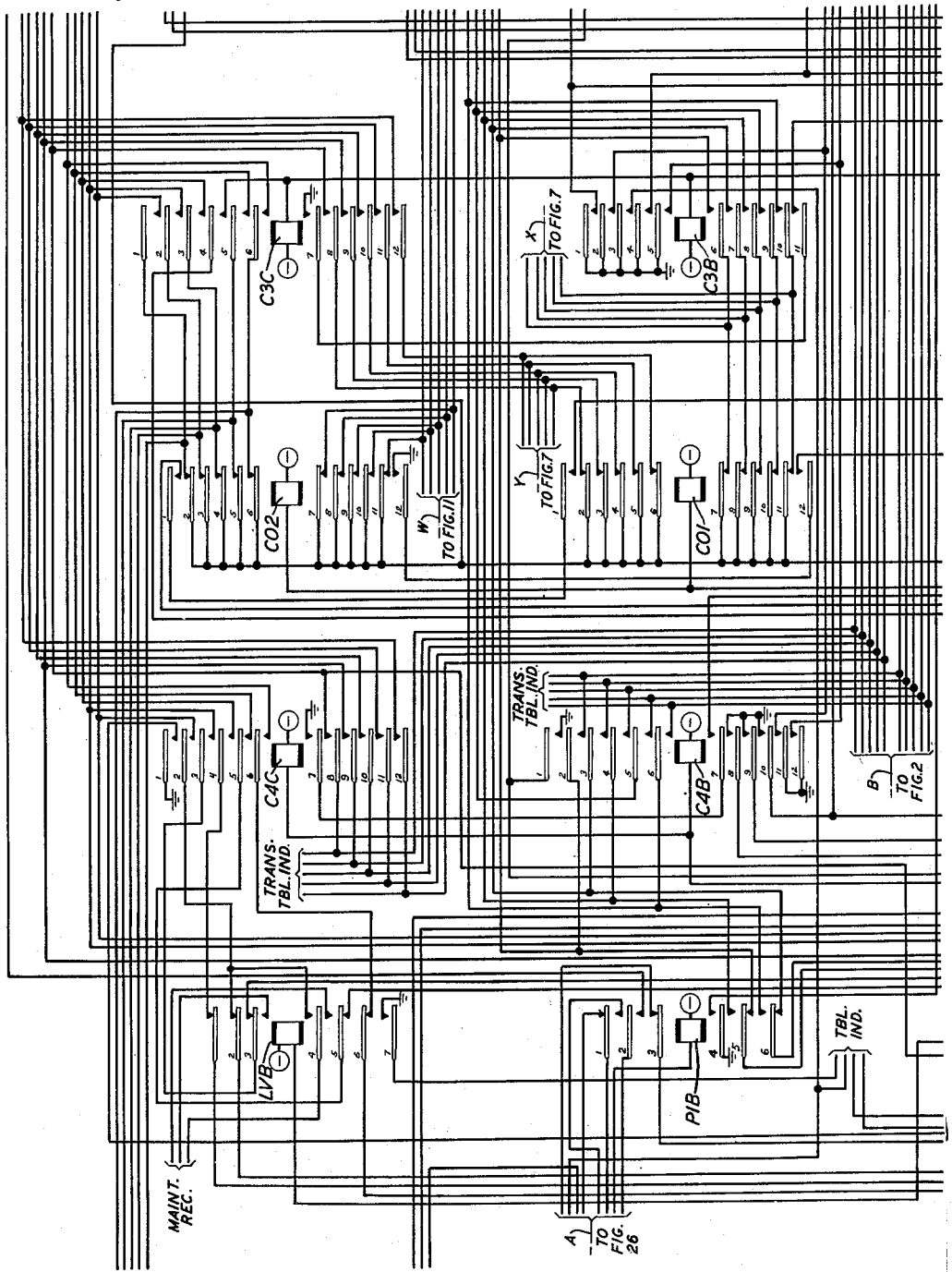
Figure 10:
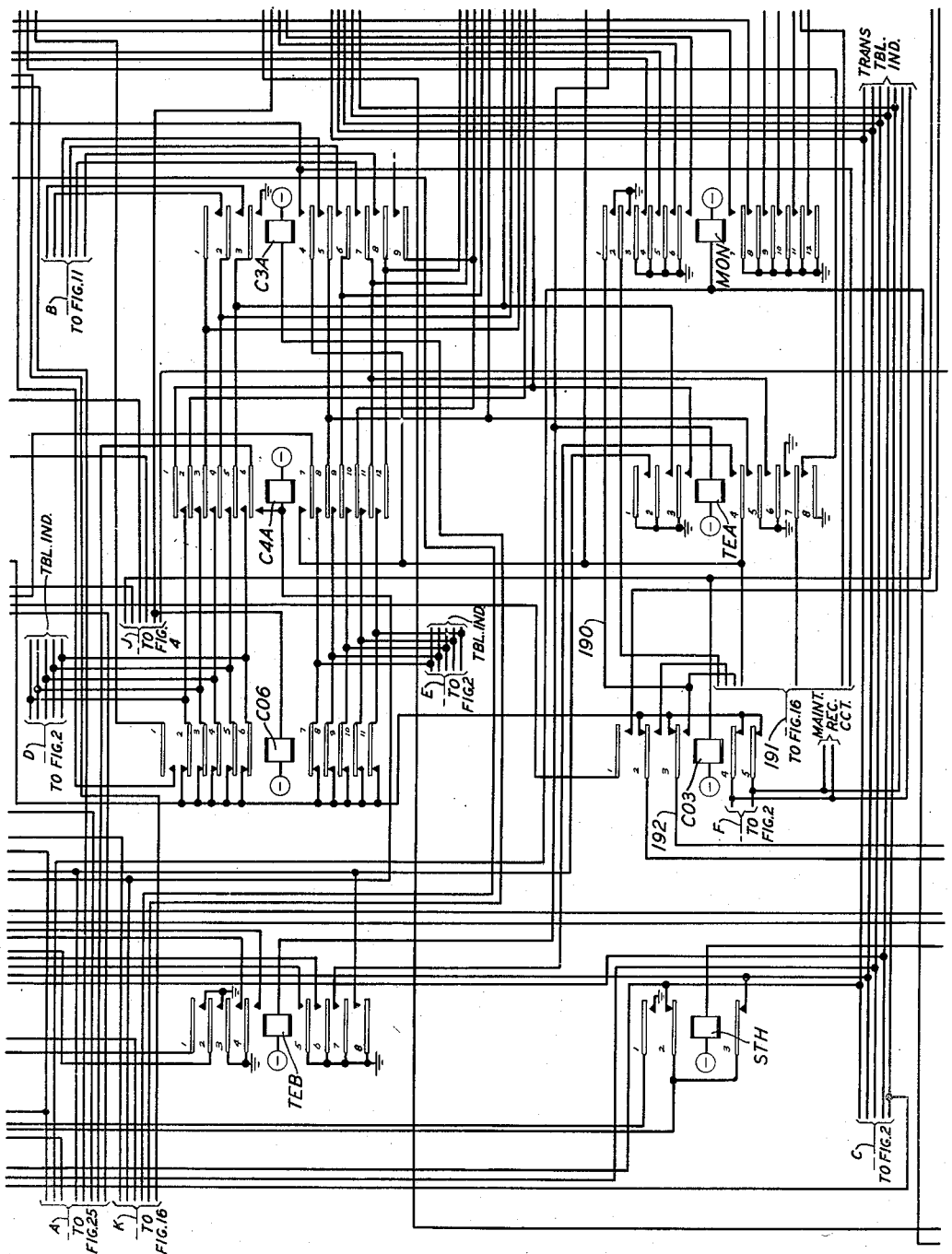
Figure 11:
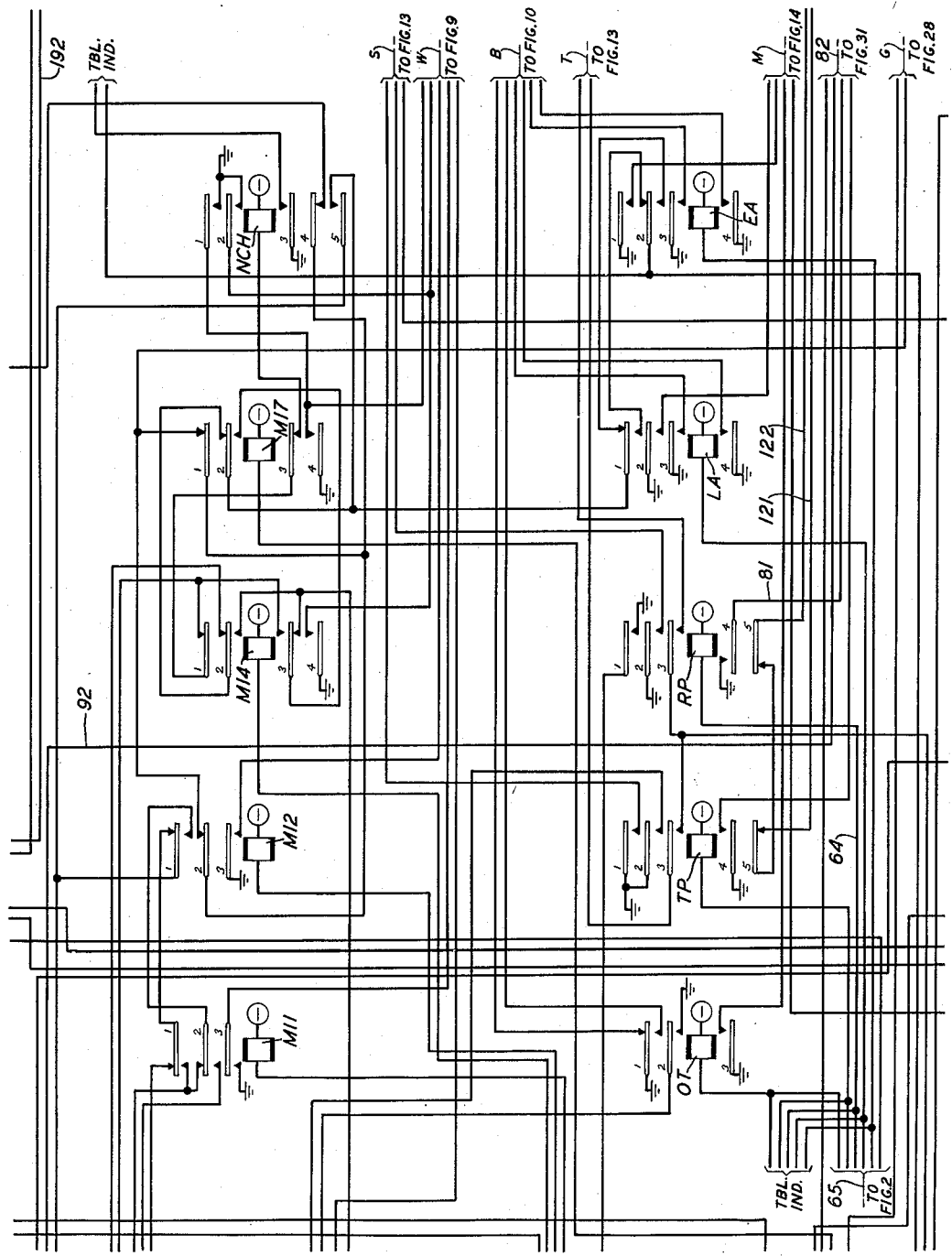
Figure 12:
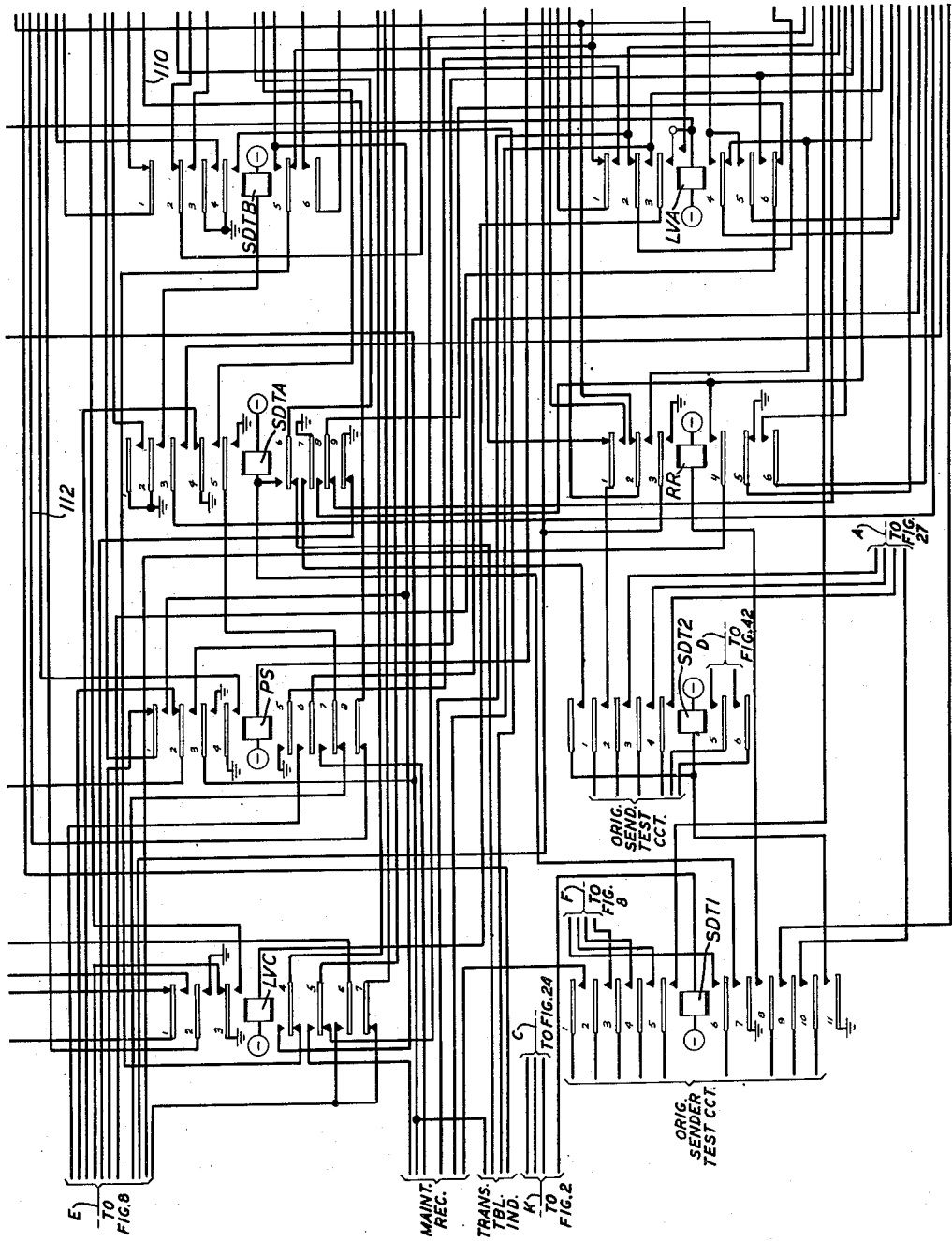
Figure 13:
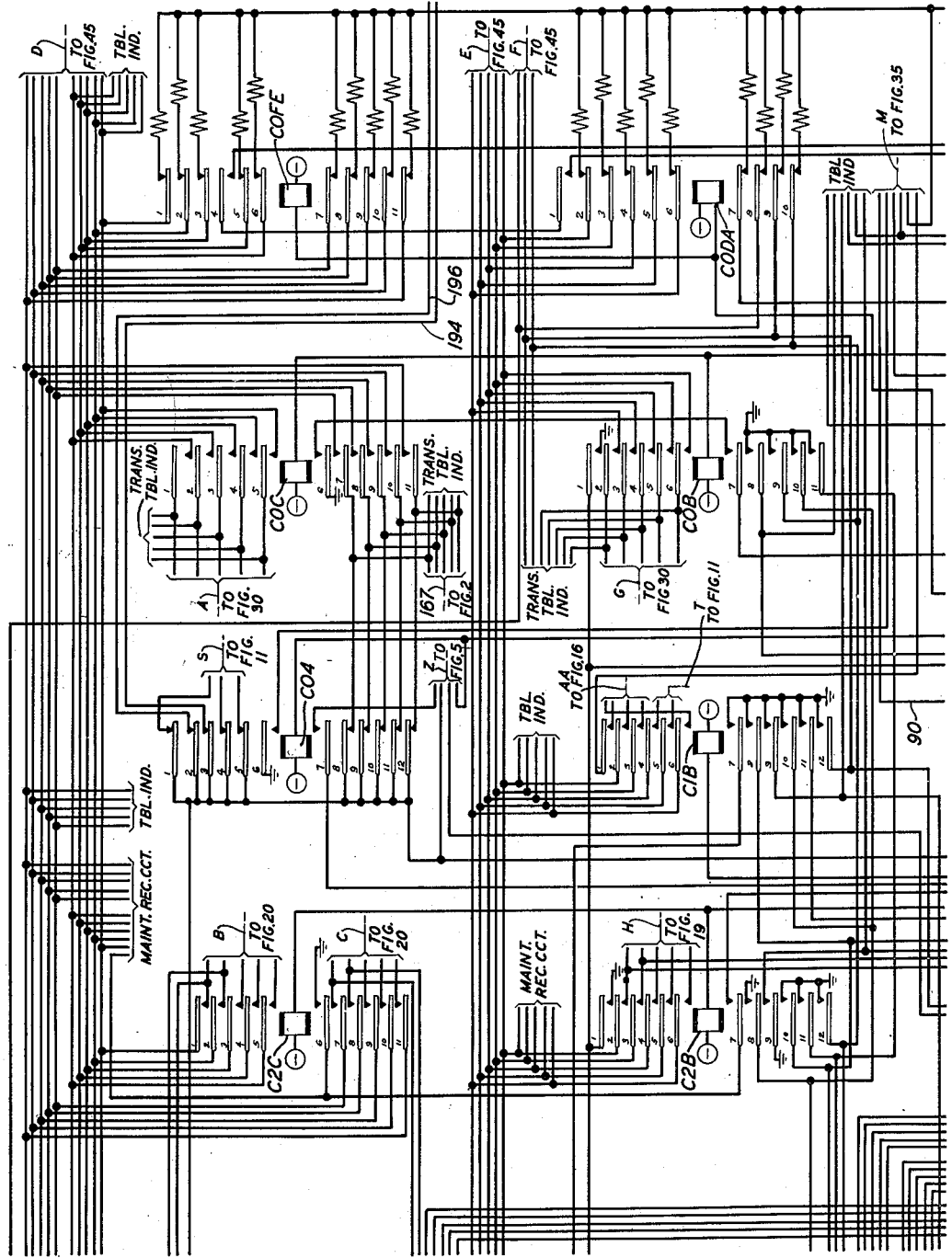
Figure 14:
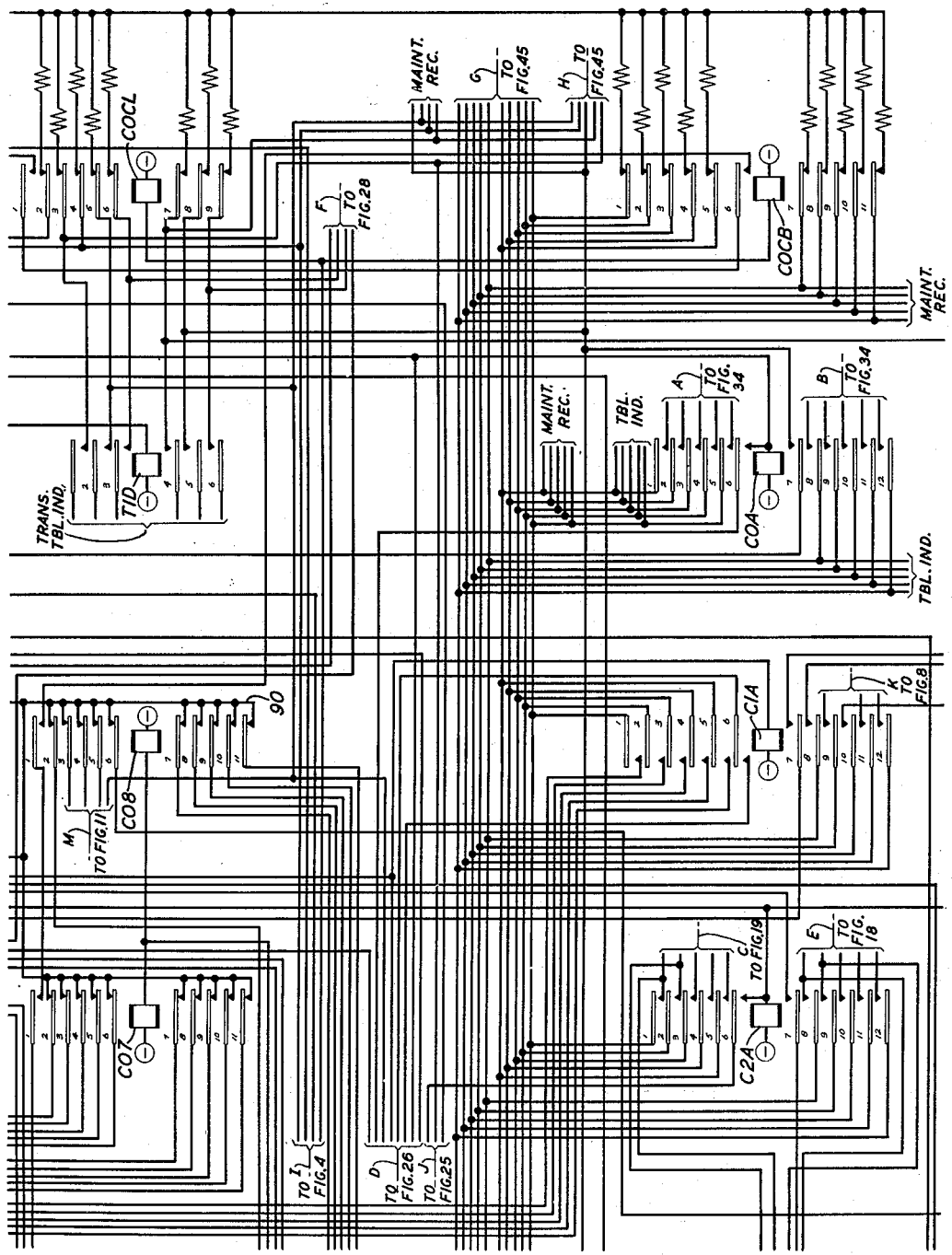
Figure 15:
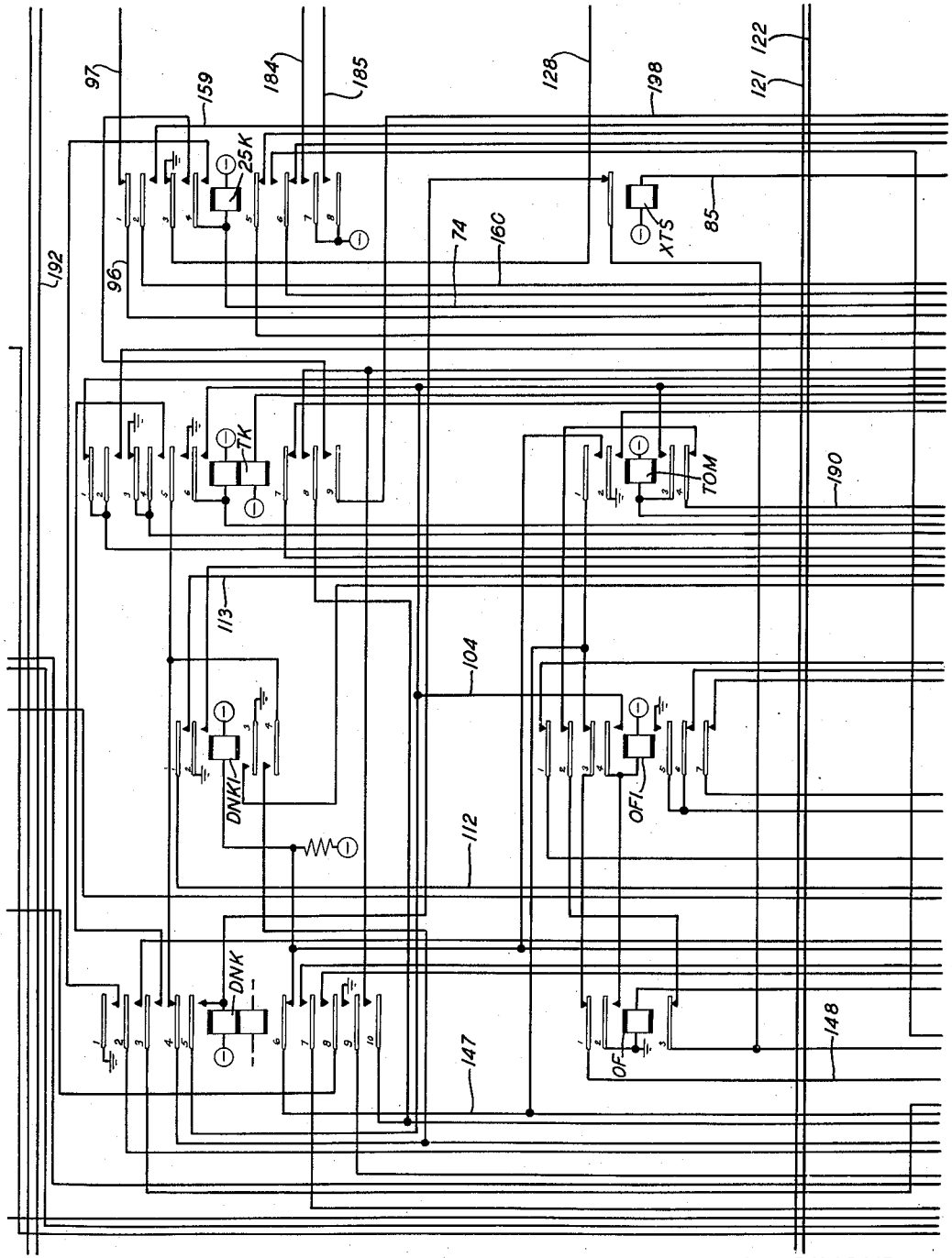
Figure 16:
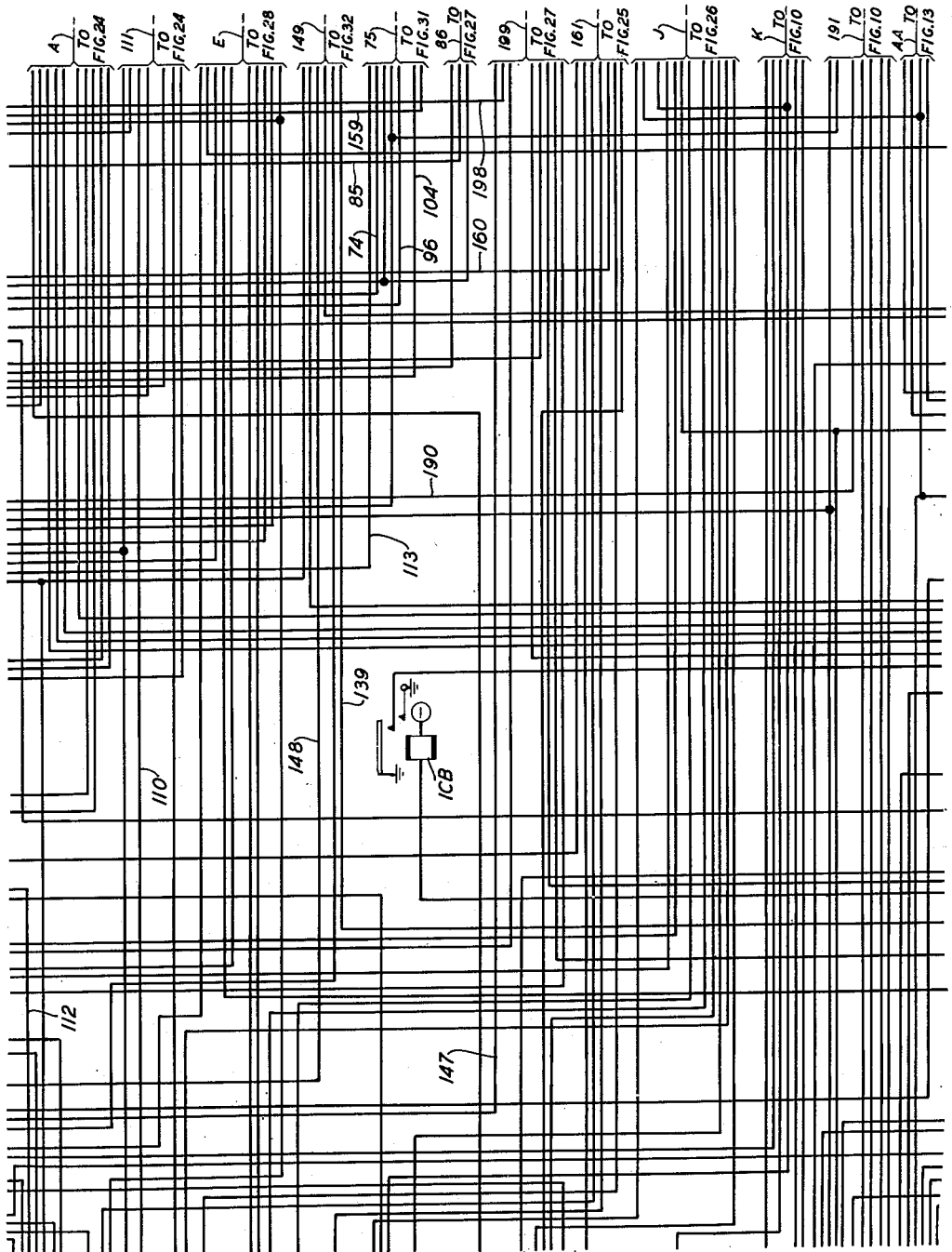
Figure 17:
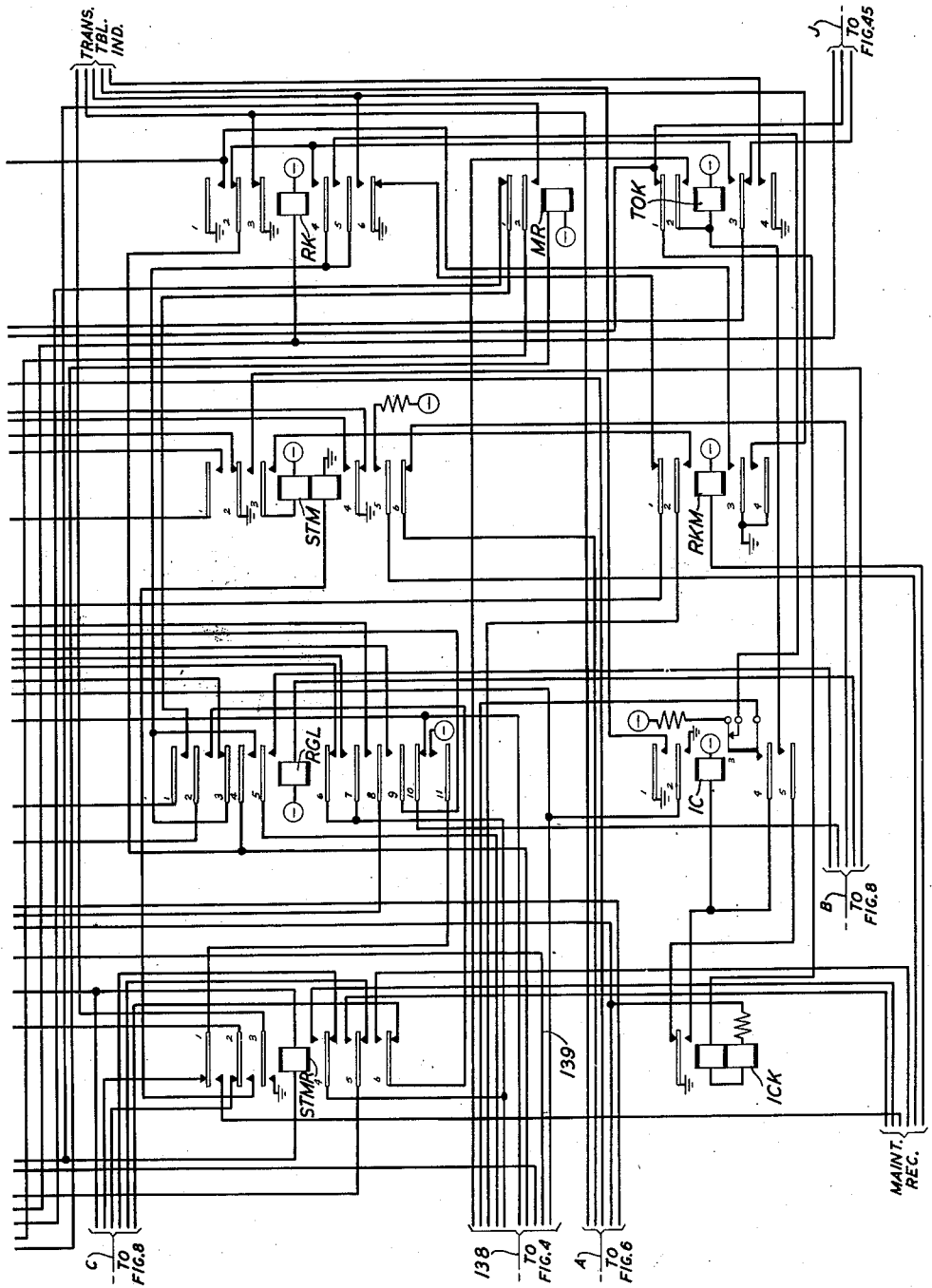
Figure 18:
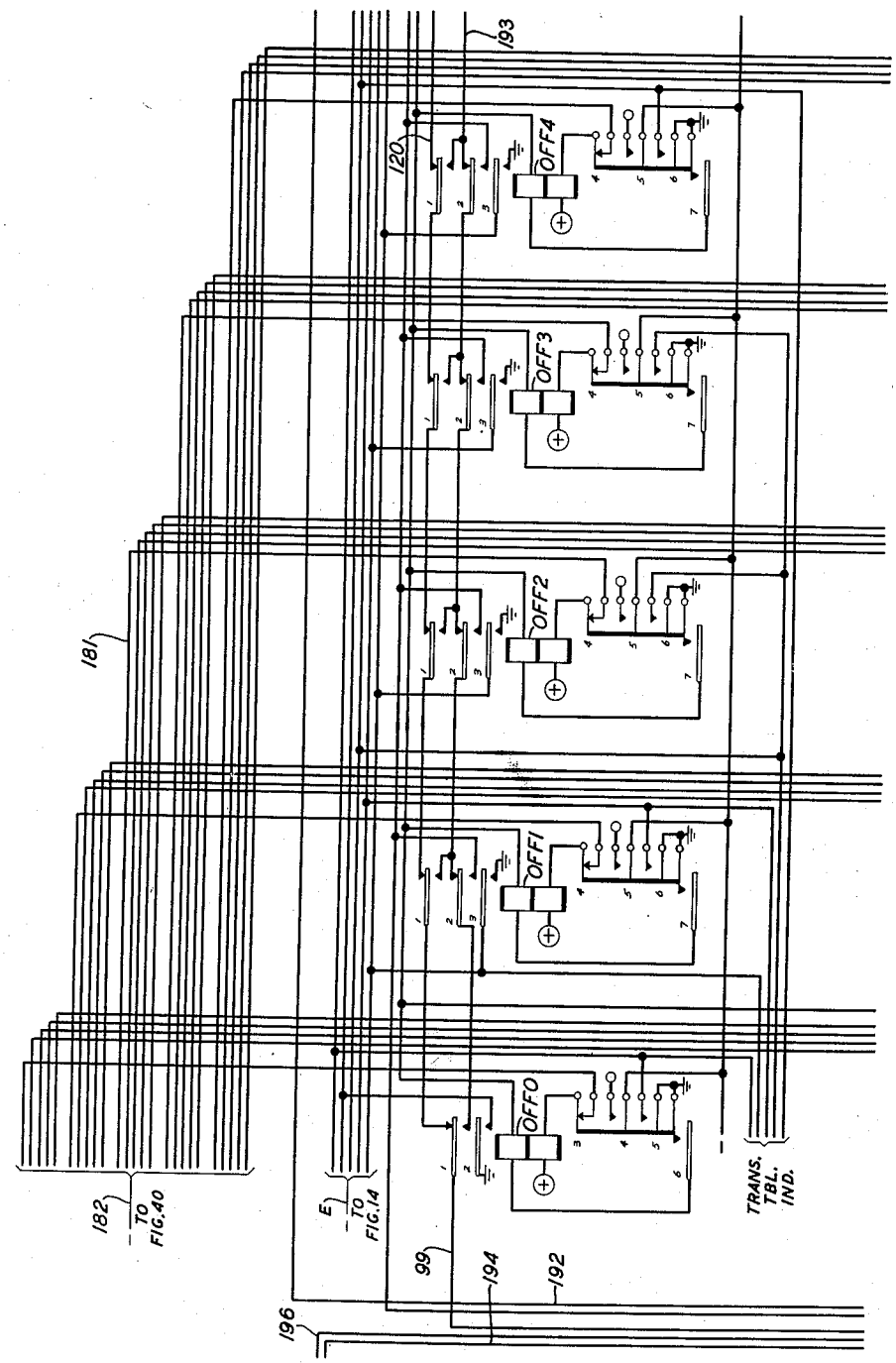
Figure 19:
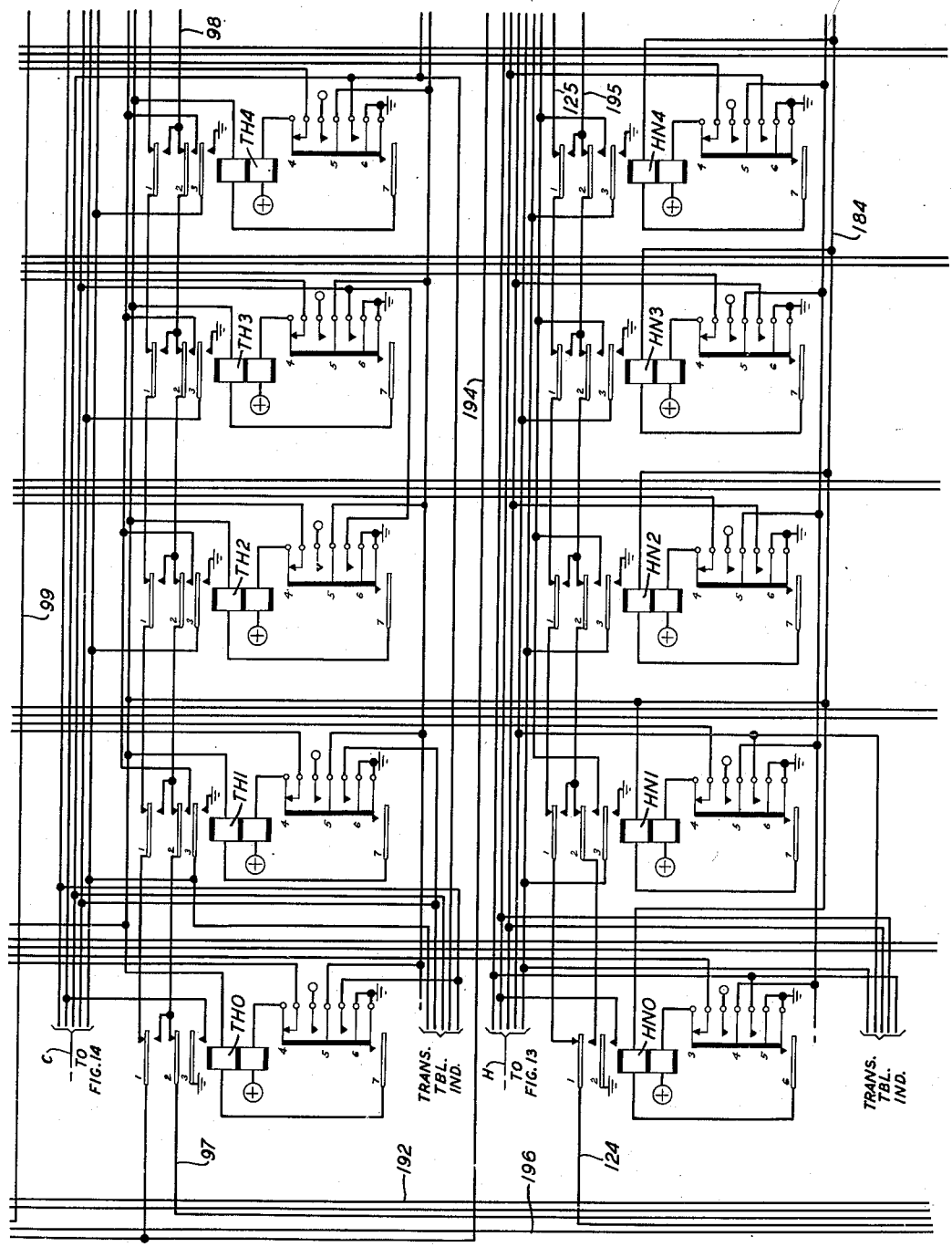
Figure 20:
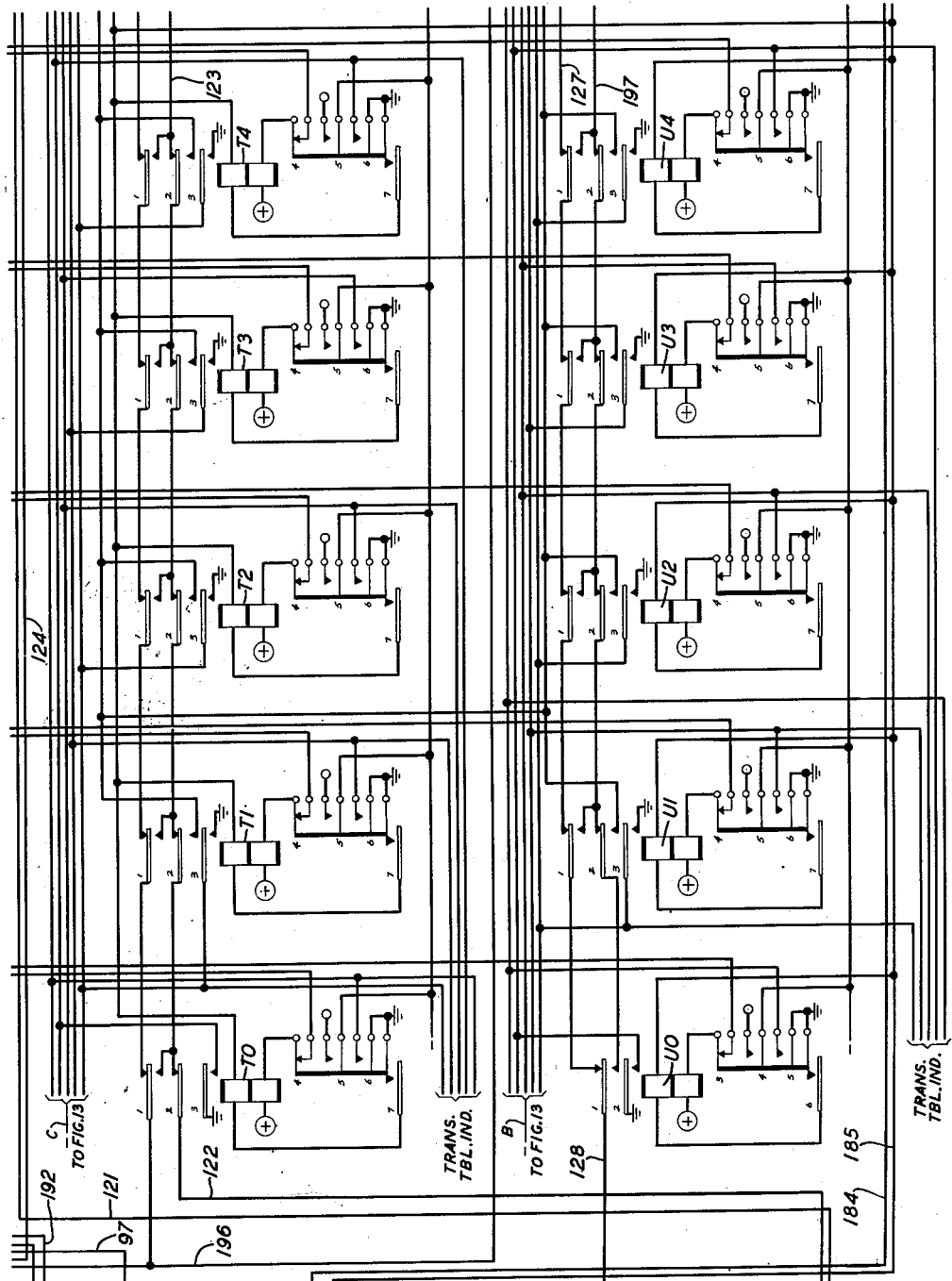
Figure 21:
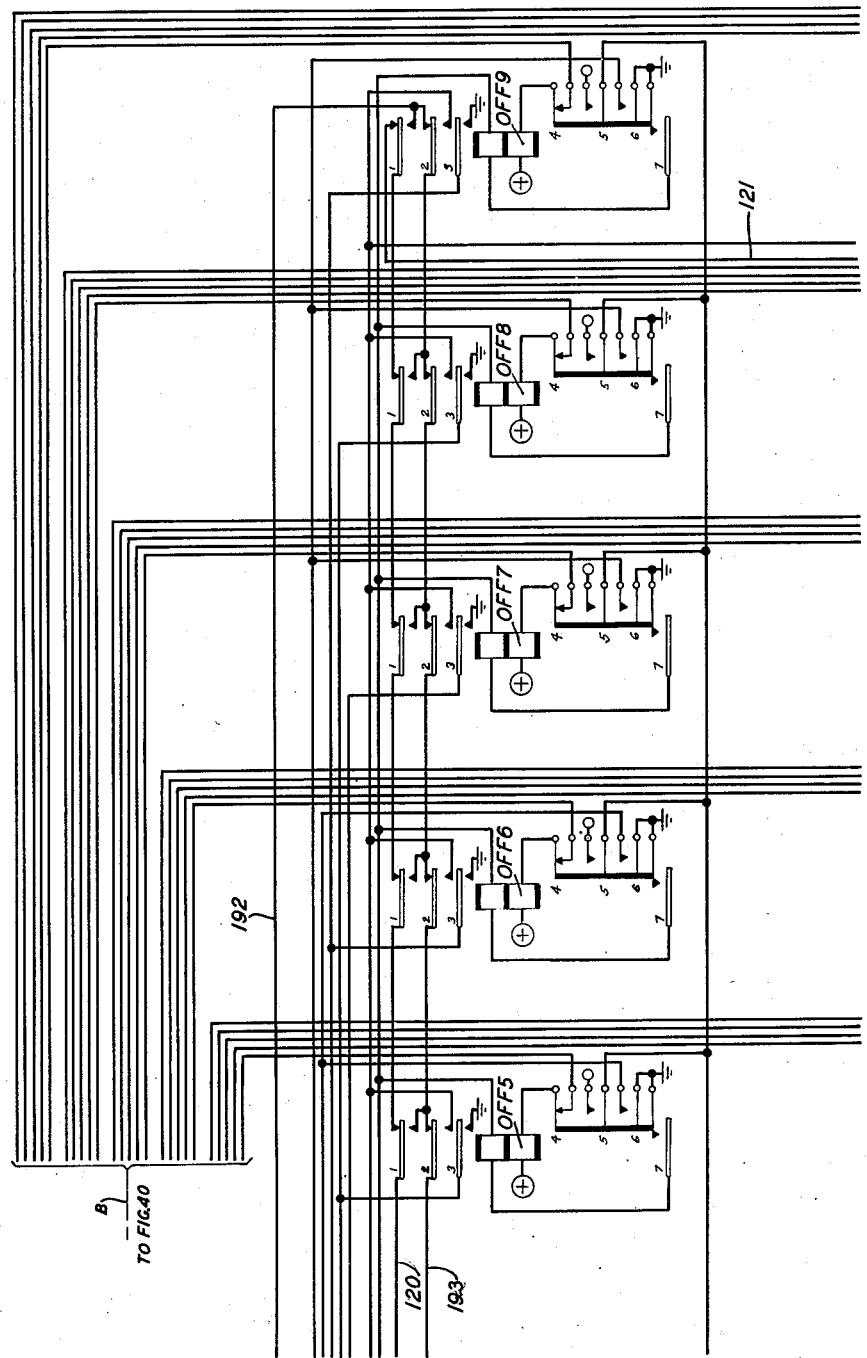
Figure 22:
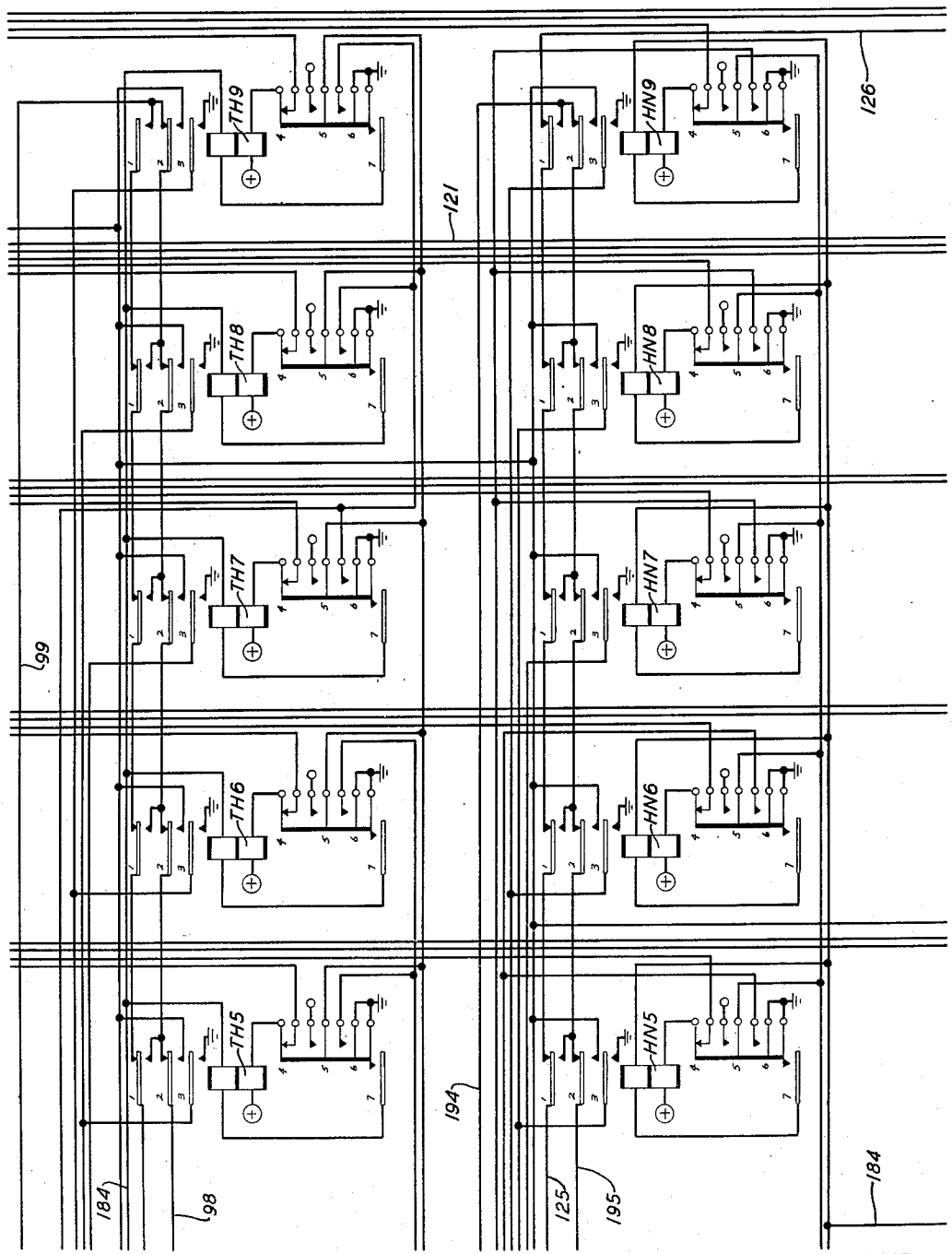
Figure 23:
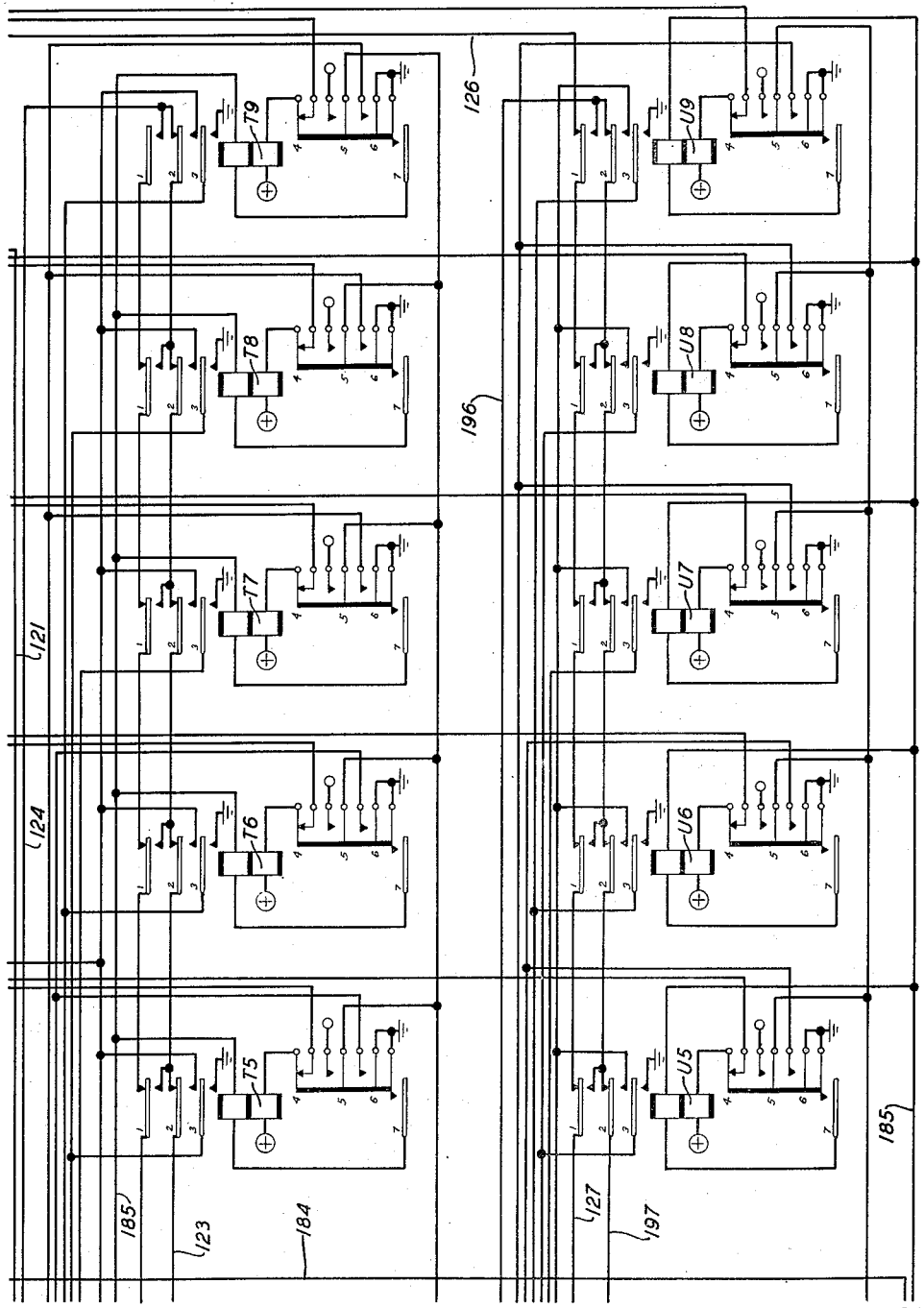
Figure 24:
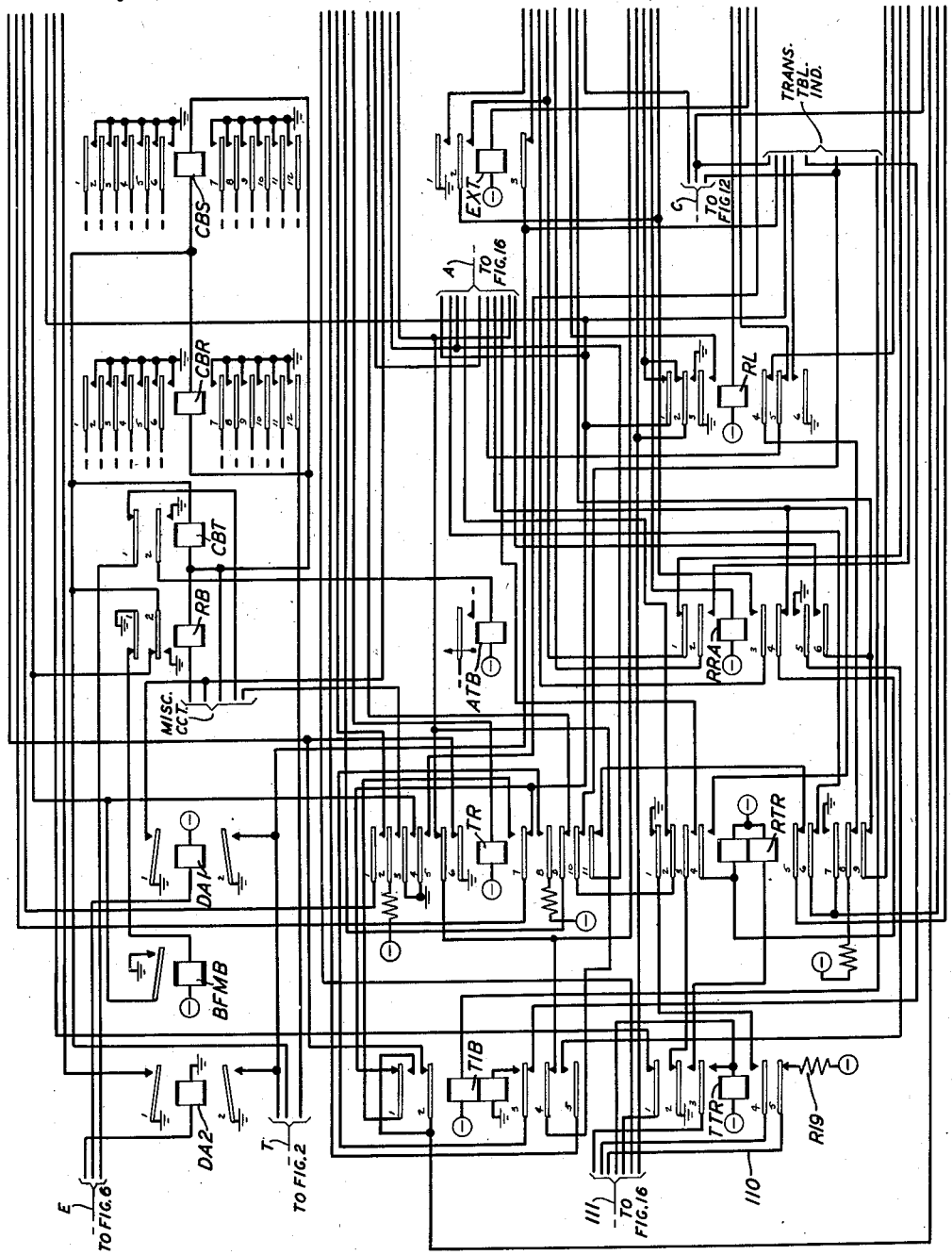
Figure 25:
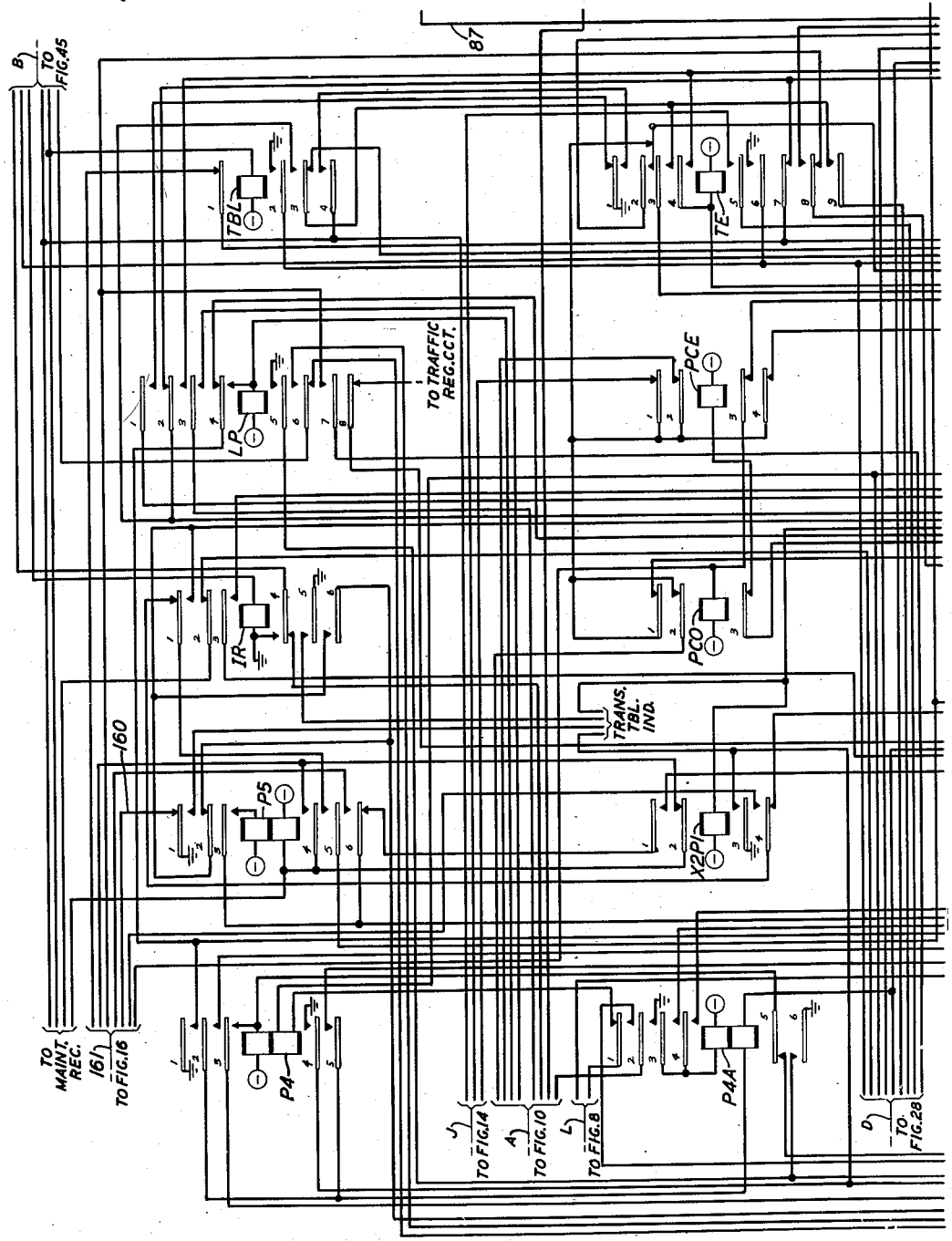
Figure 26:
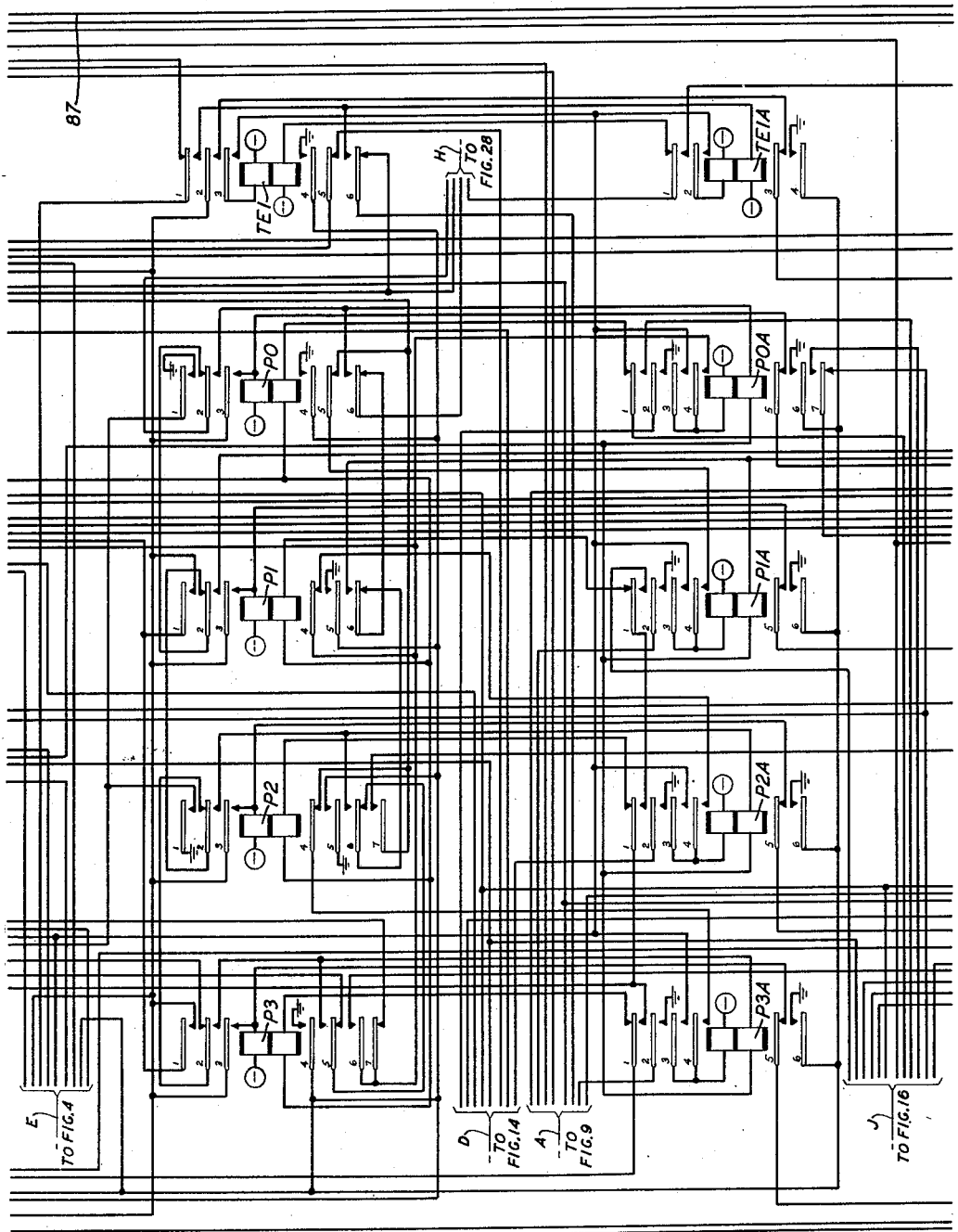
Figure 27:
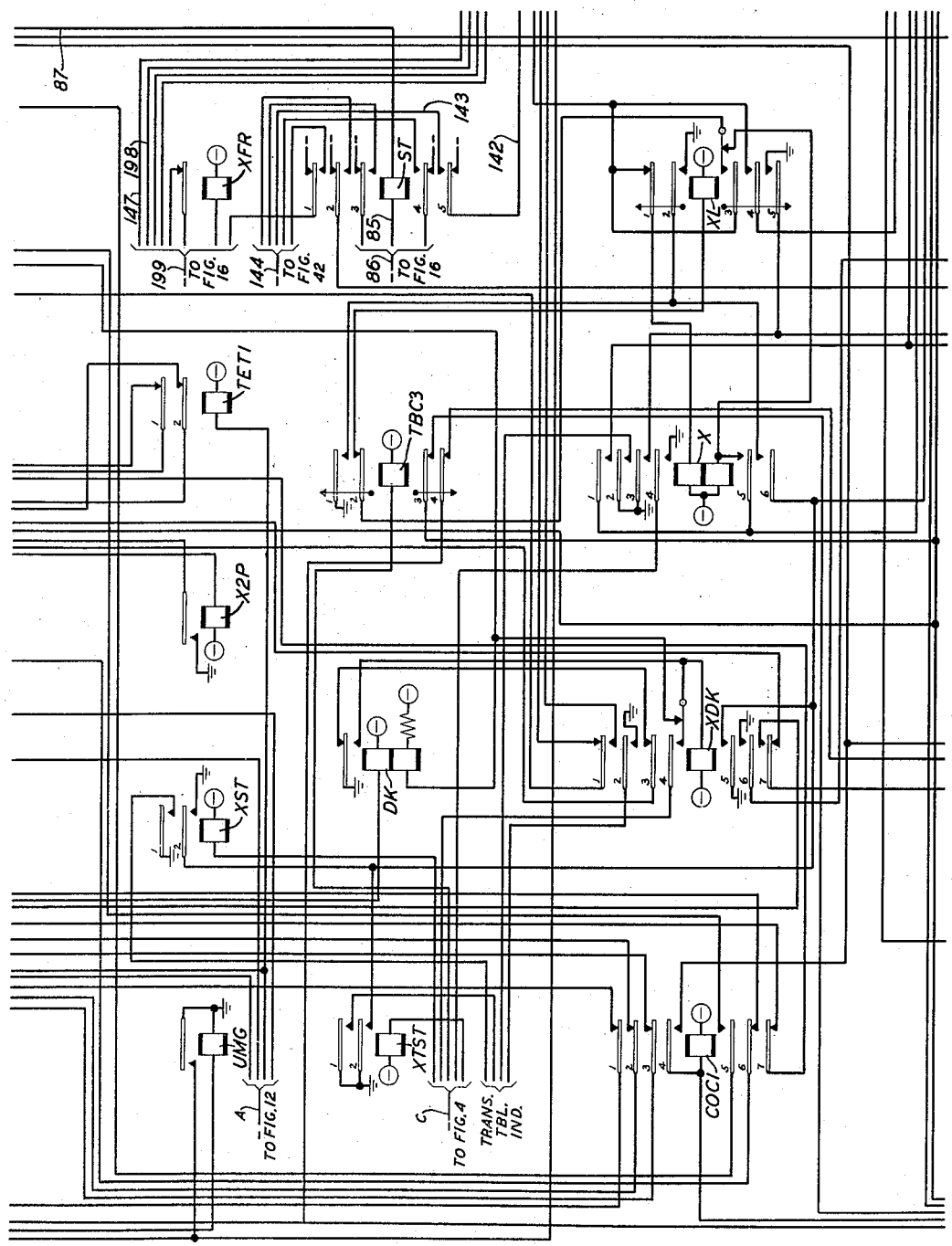
Figure 28:
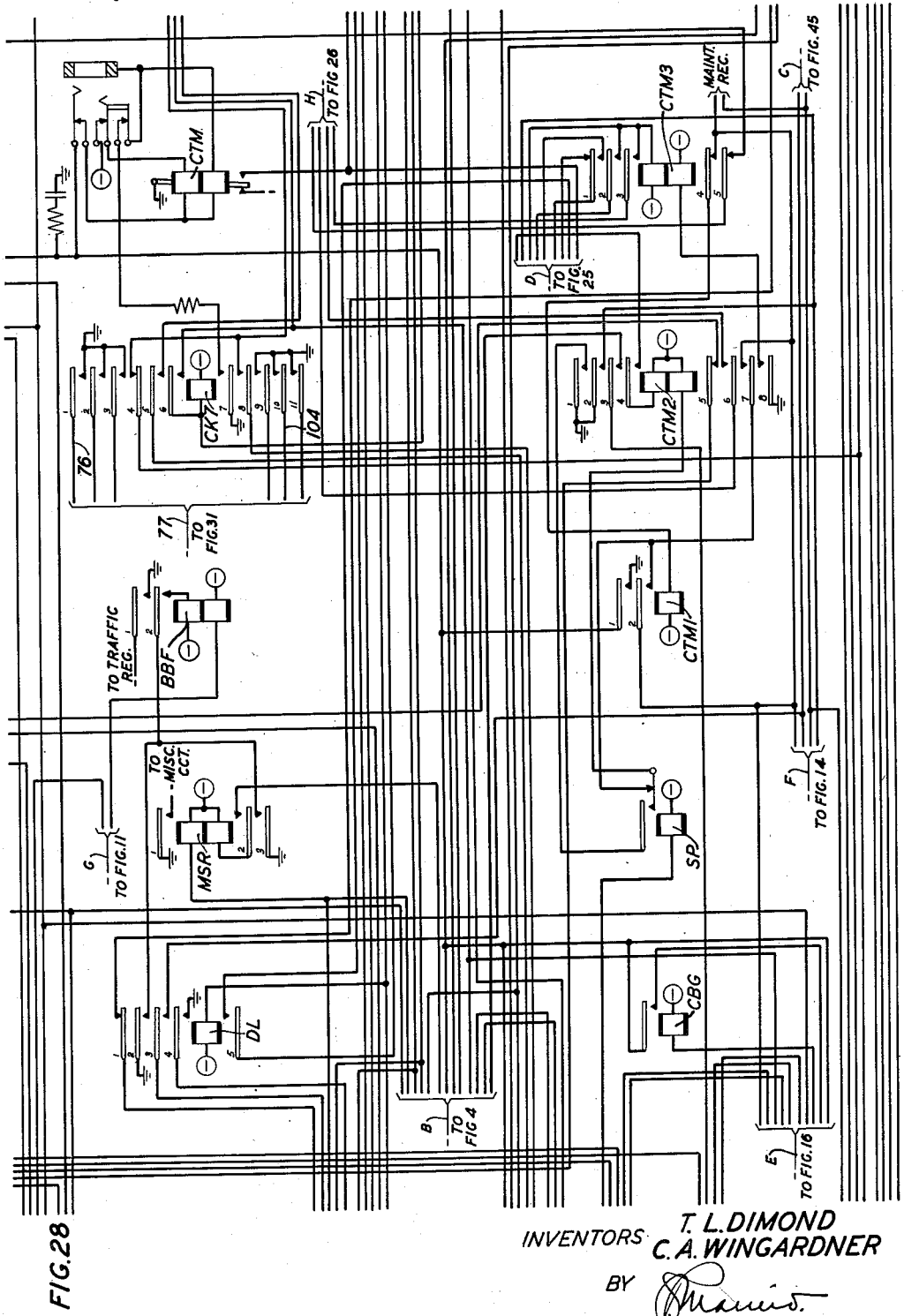
Figure 30:
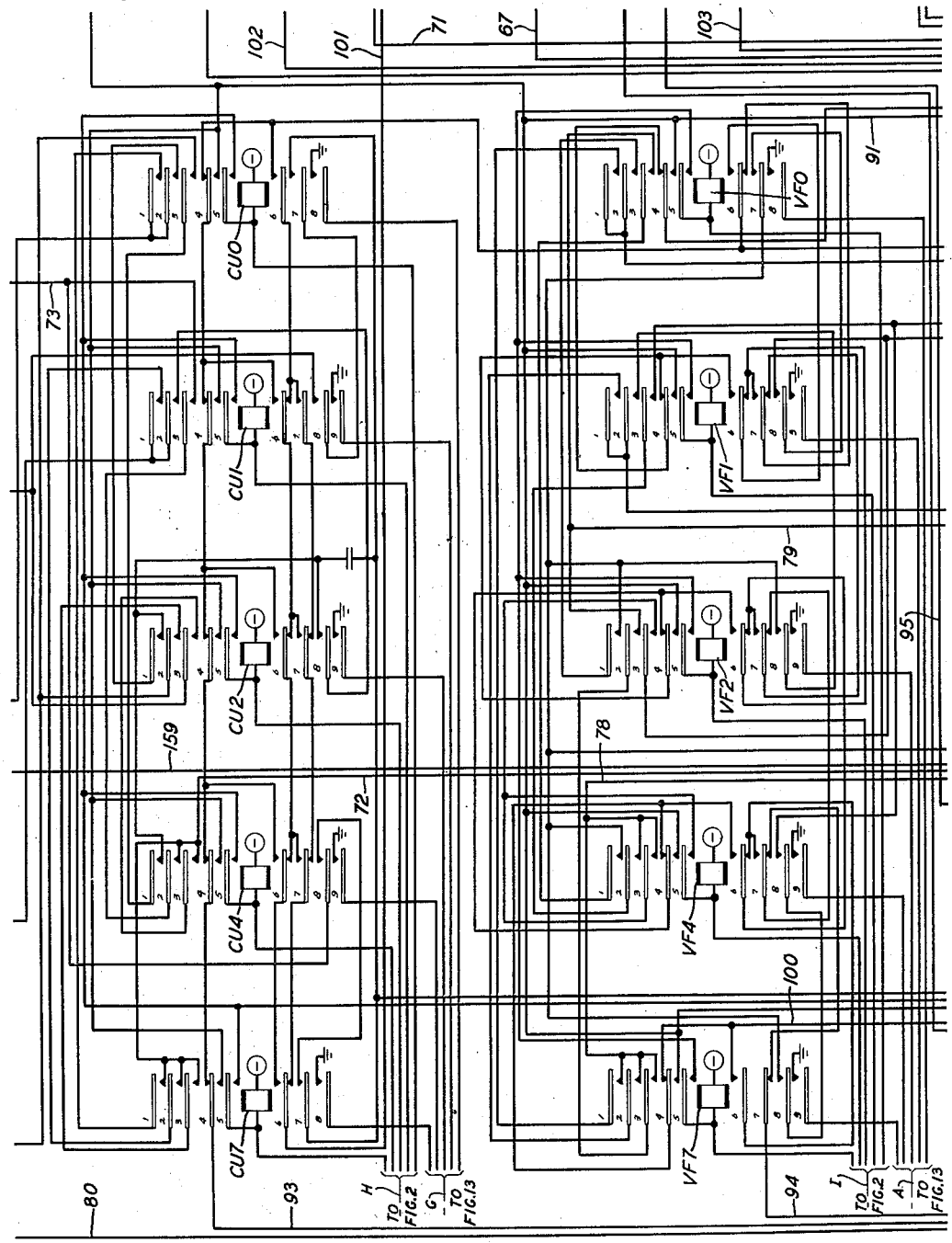
Figure 31:
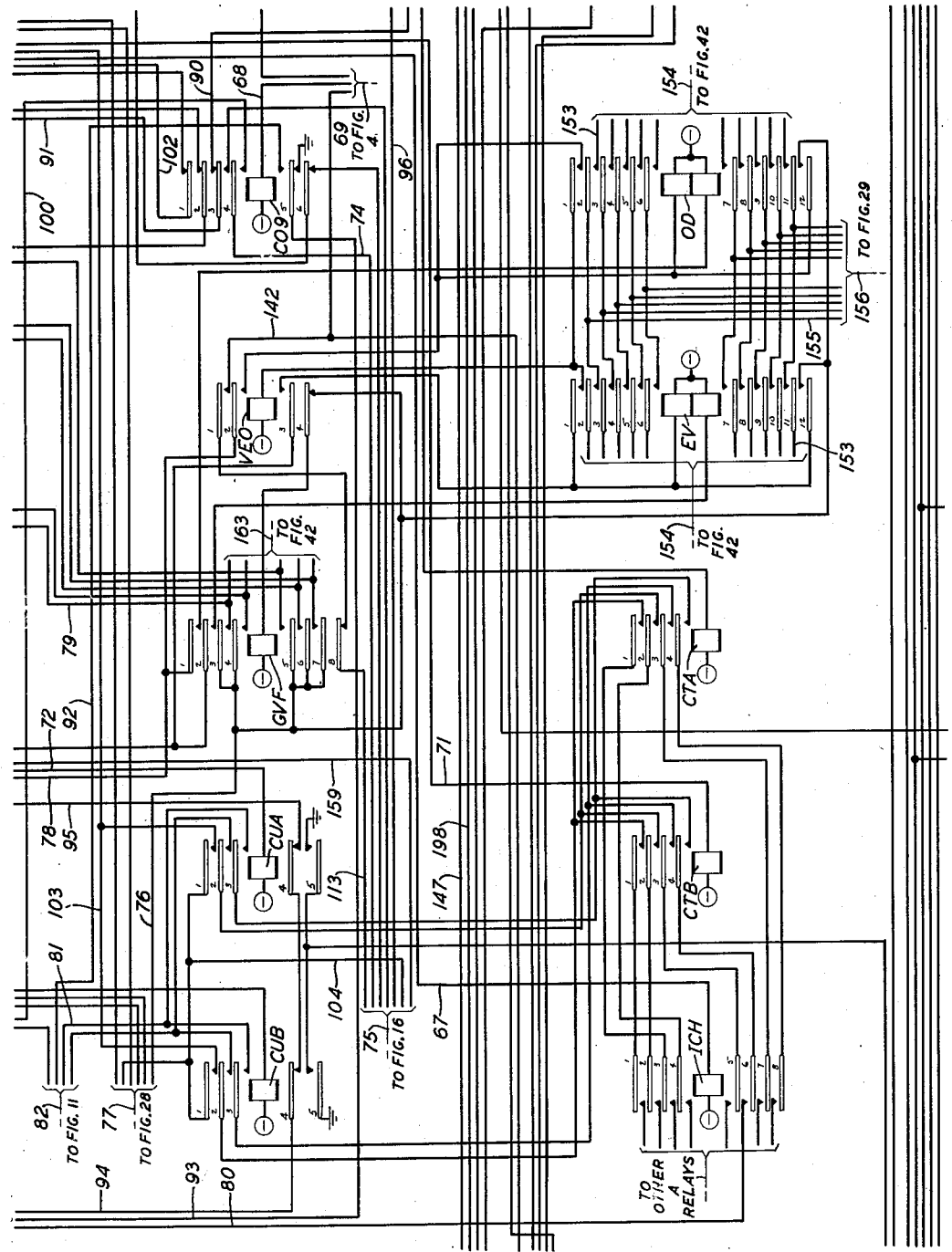
Figure 32:
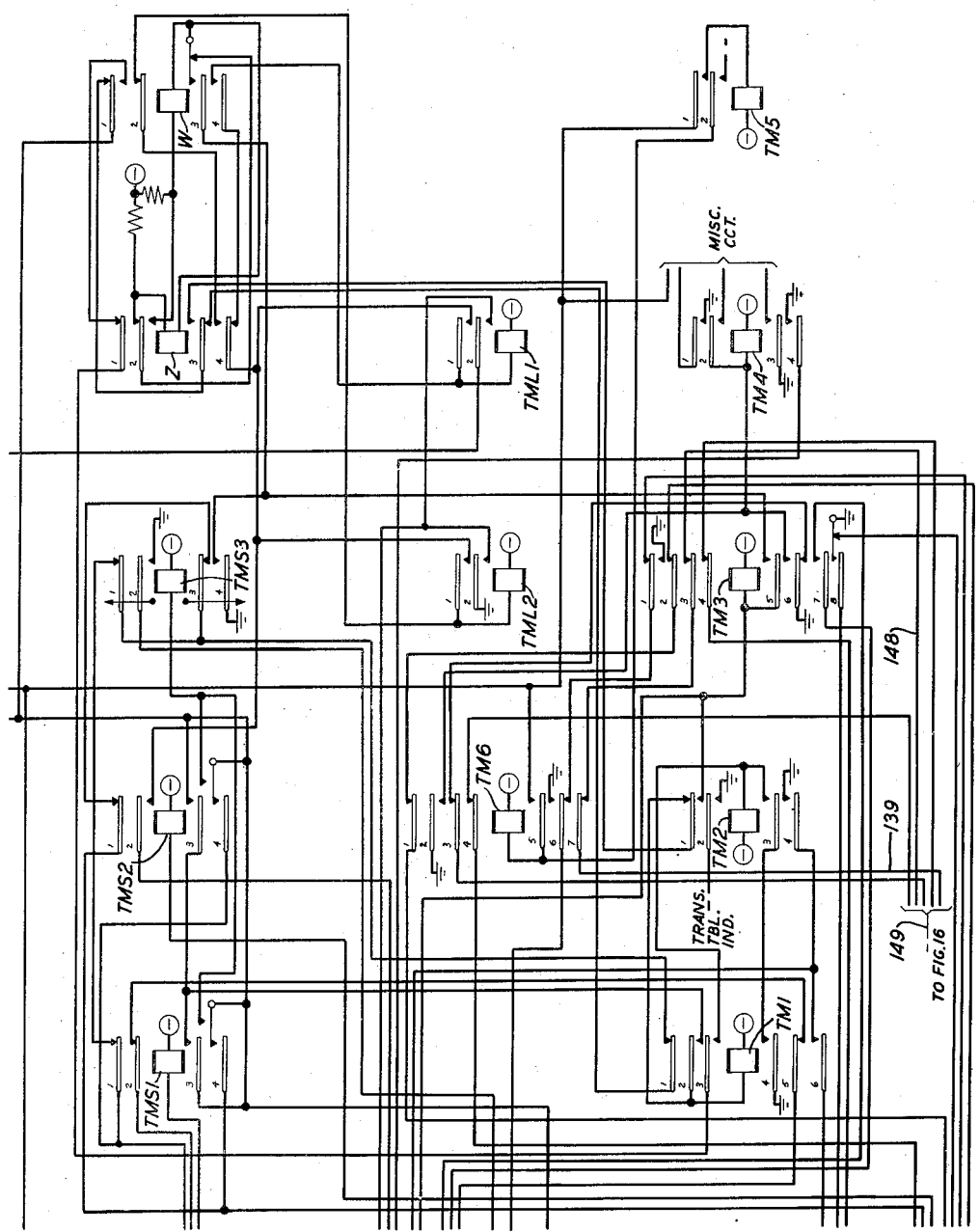
Figure 33:
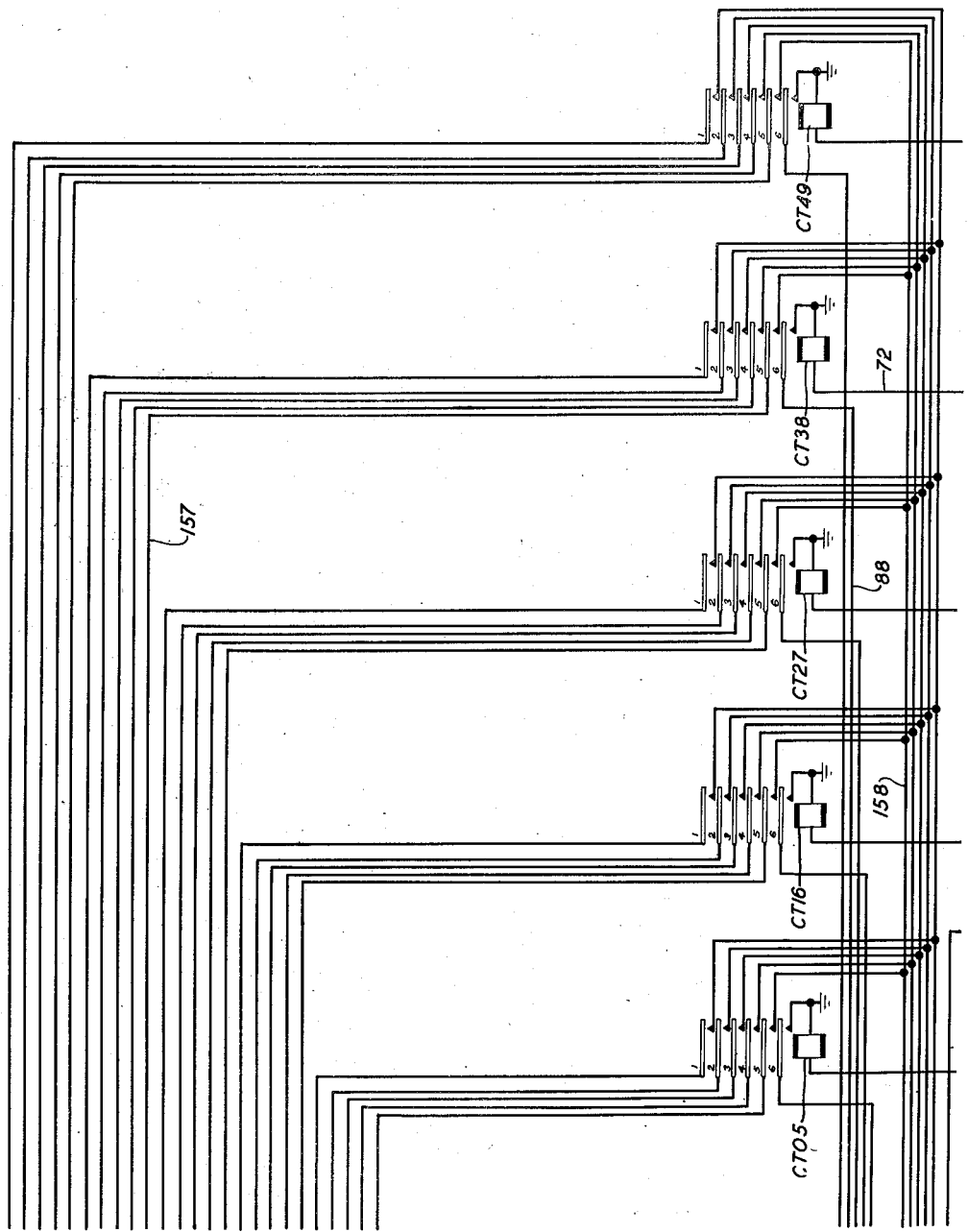
Figure 34:
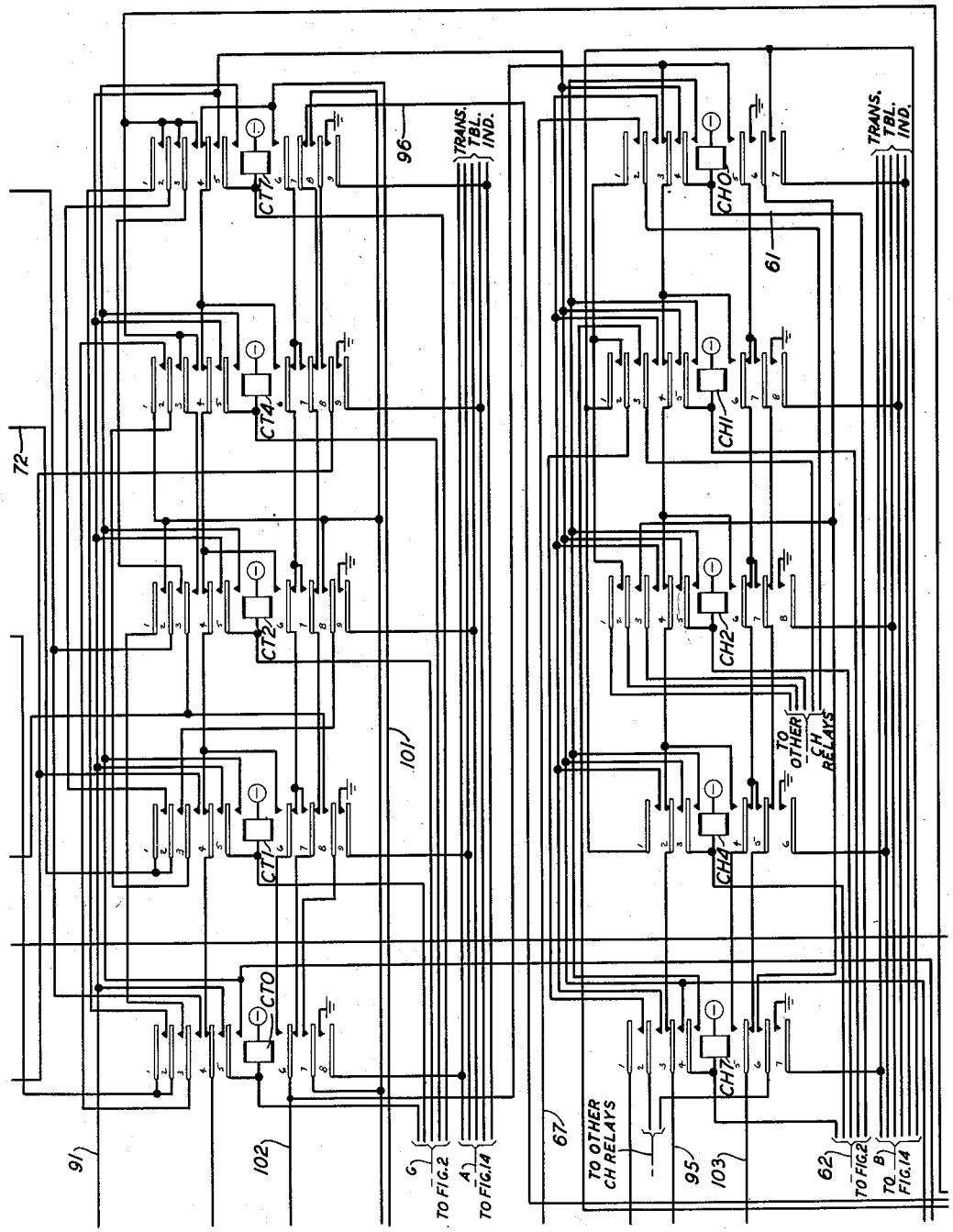
Figure 35:
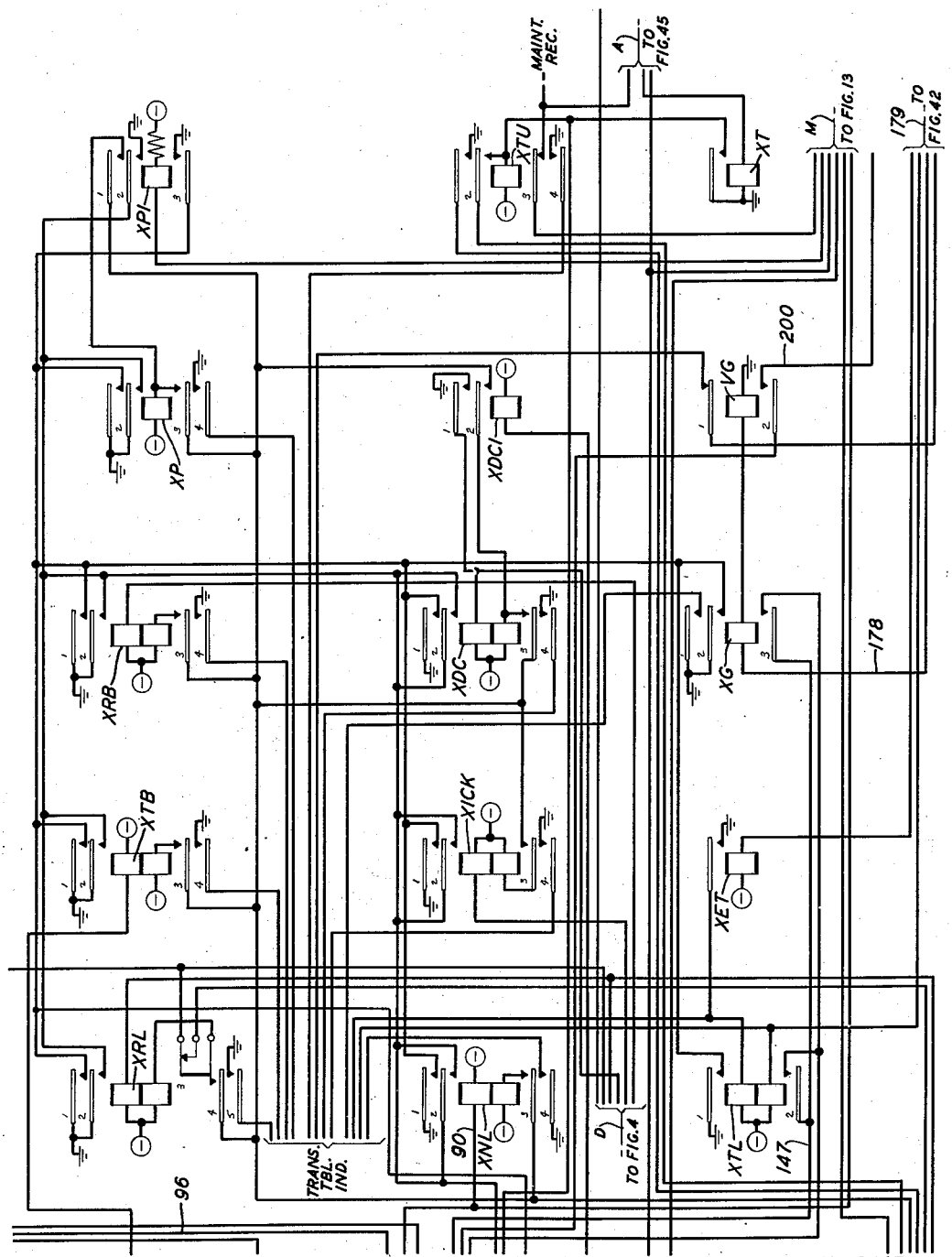
Figure 36:
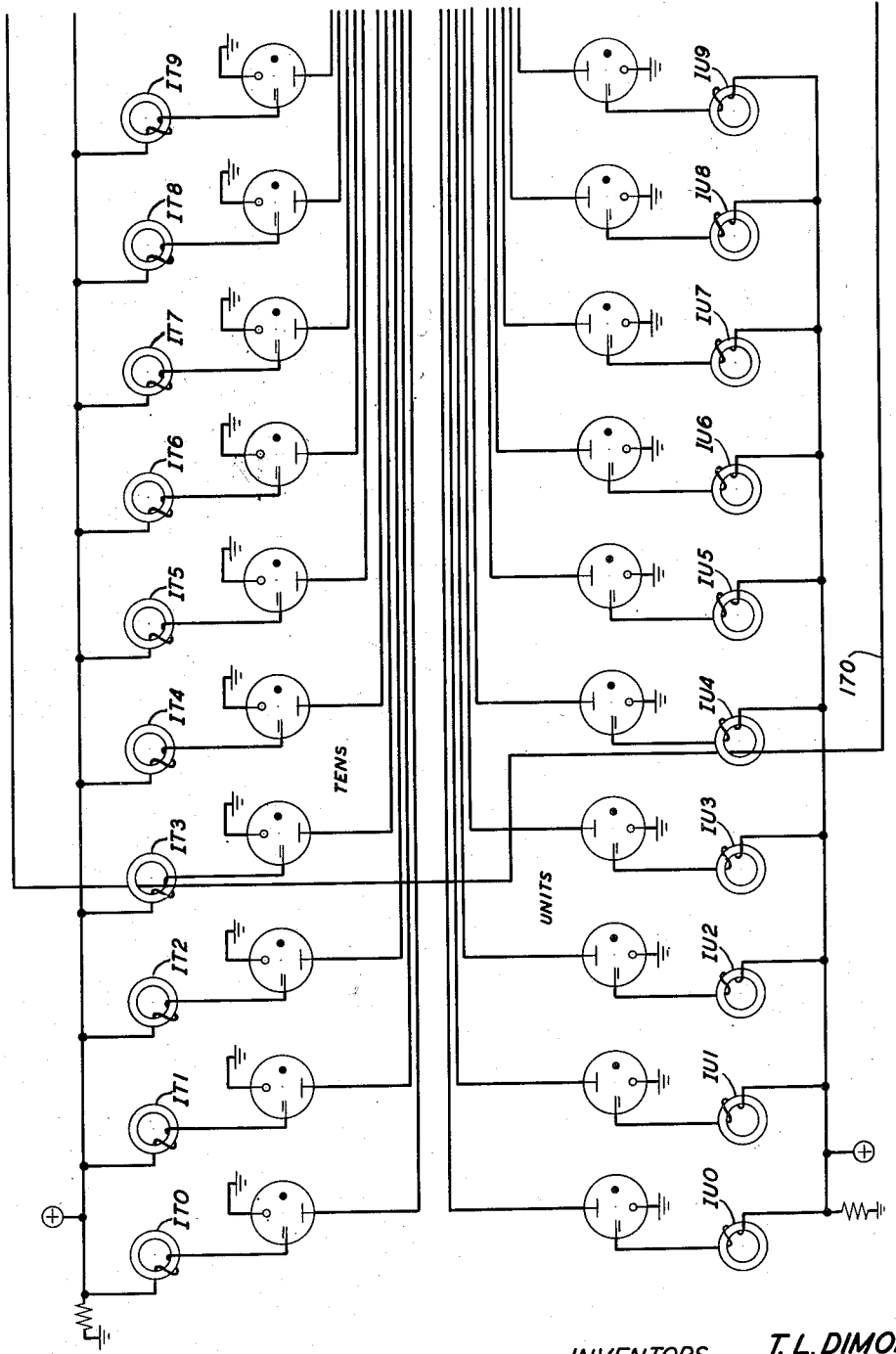
Figs. 36 through 44 show the translator.
Figure 37:
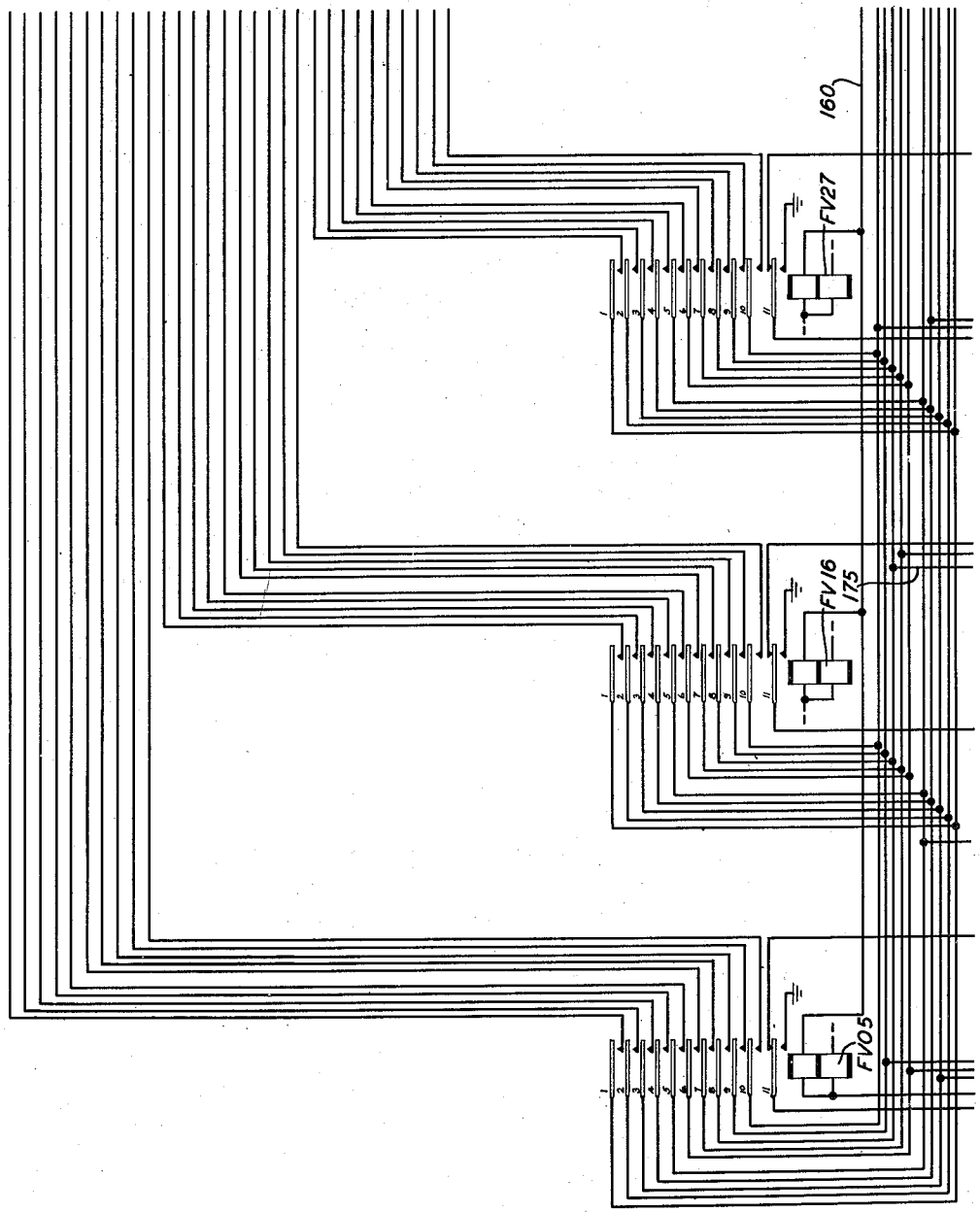
Figure 38:
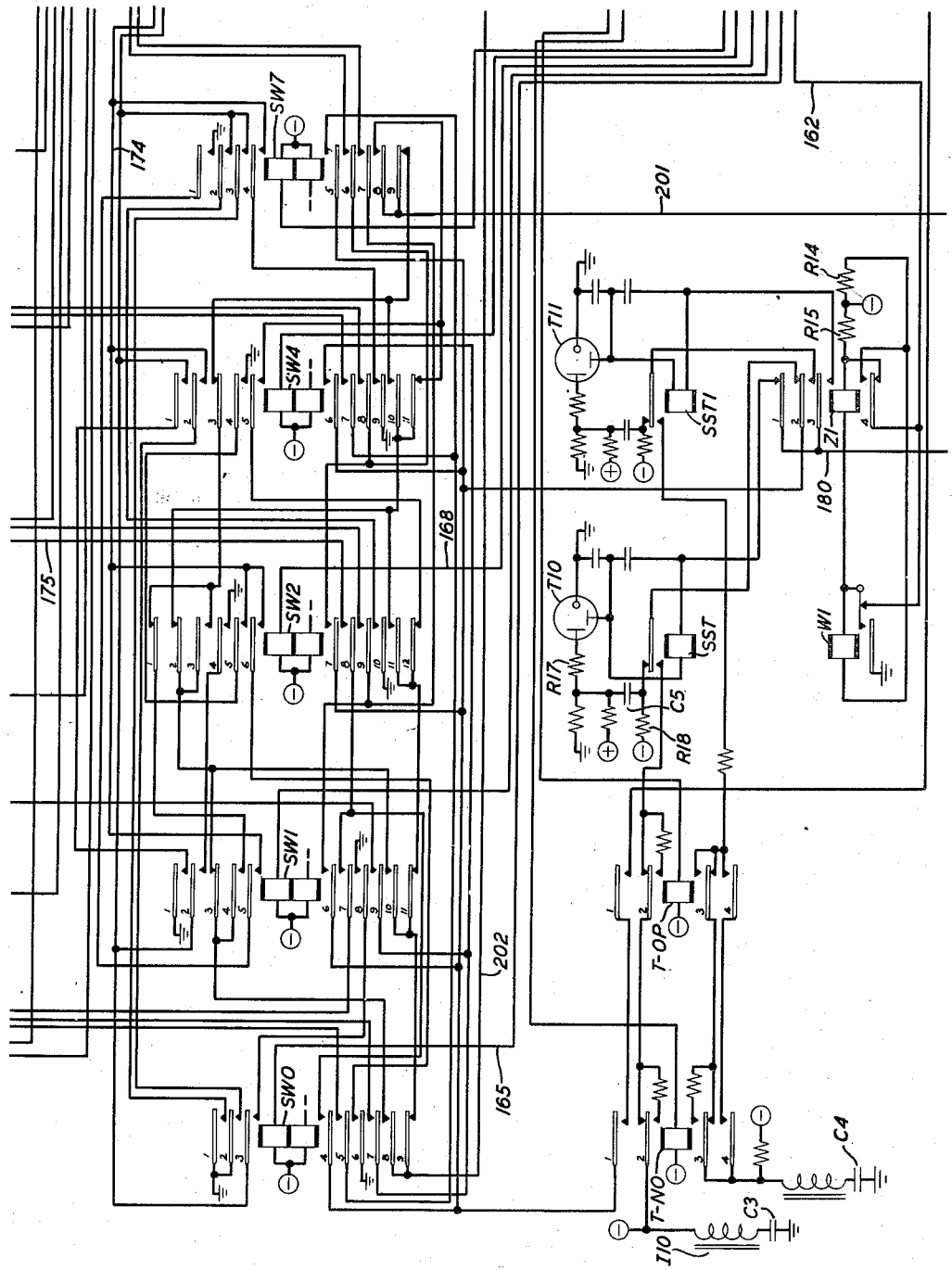
Figure 39:
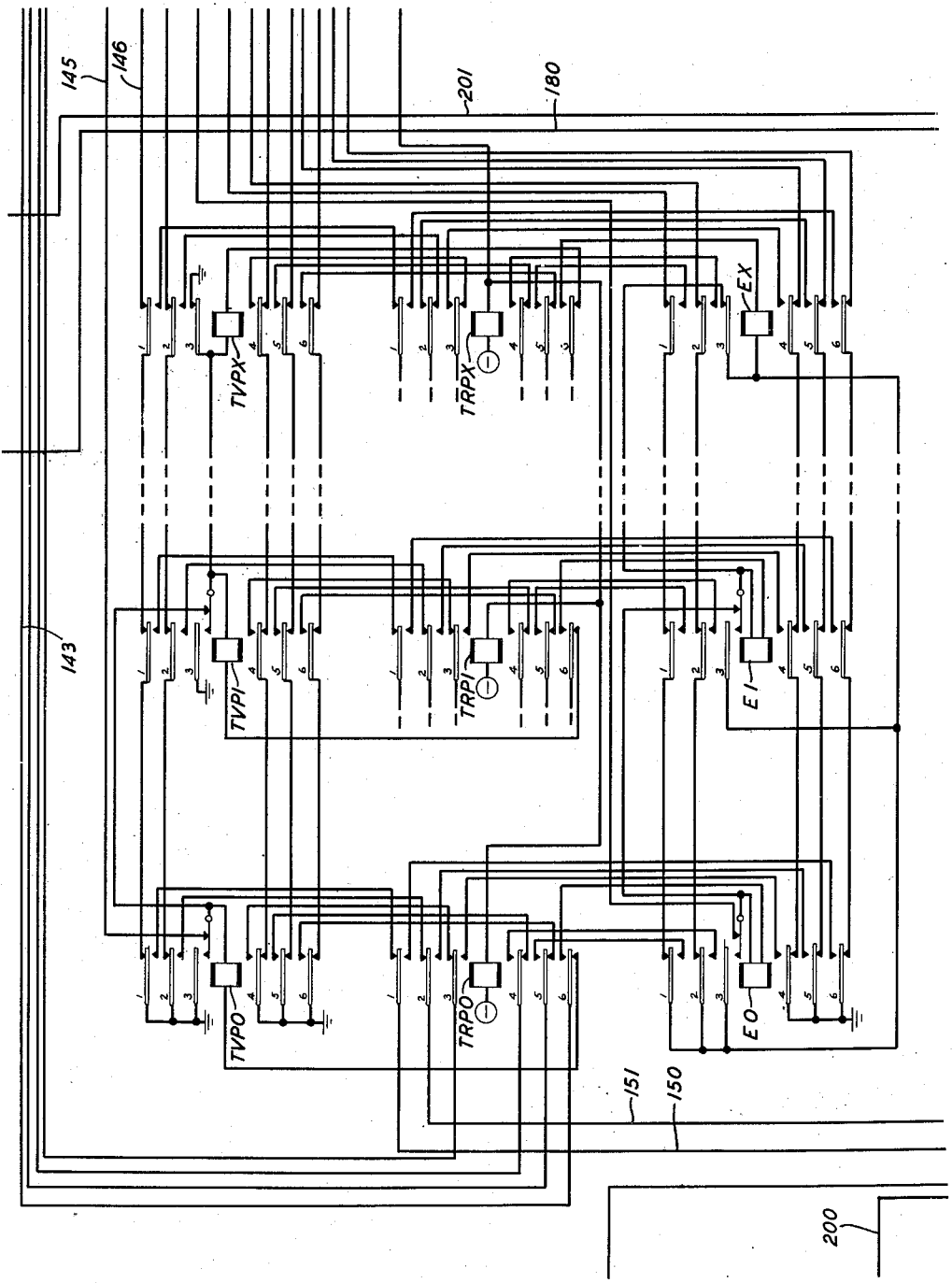
Figure 40:
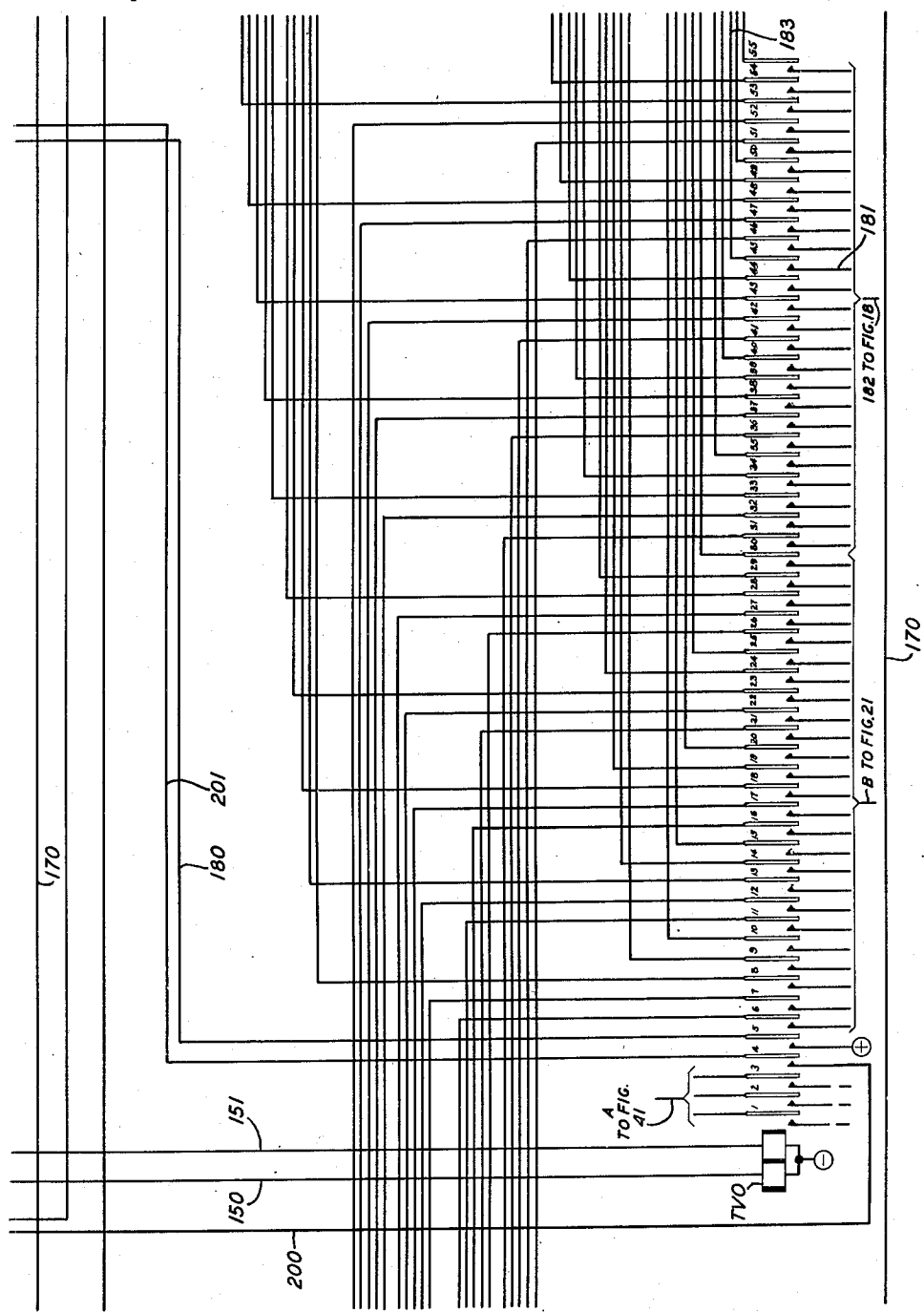
Figure 41:
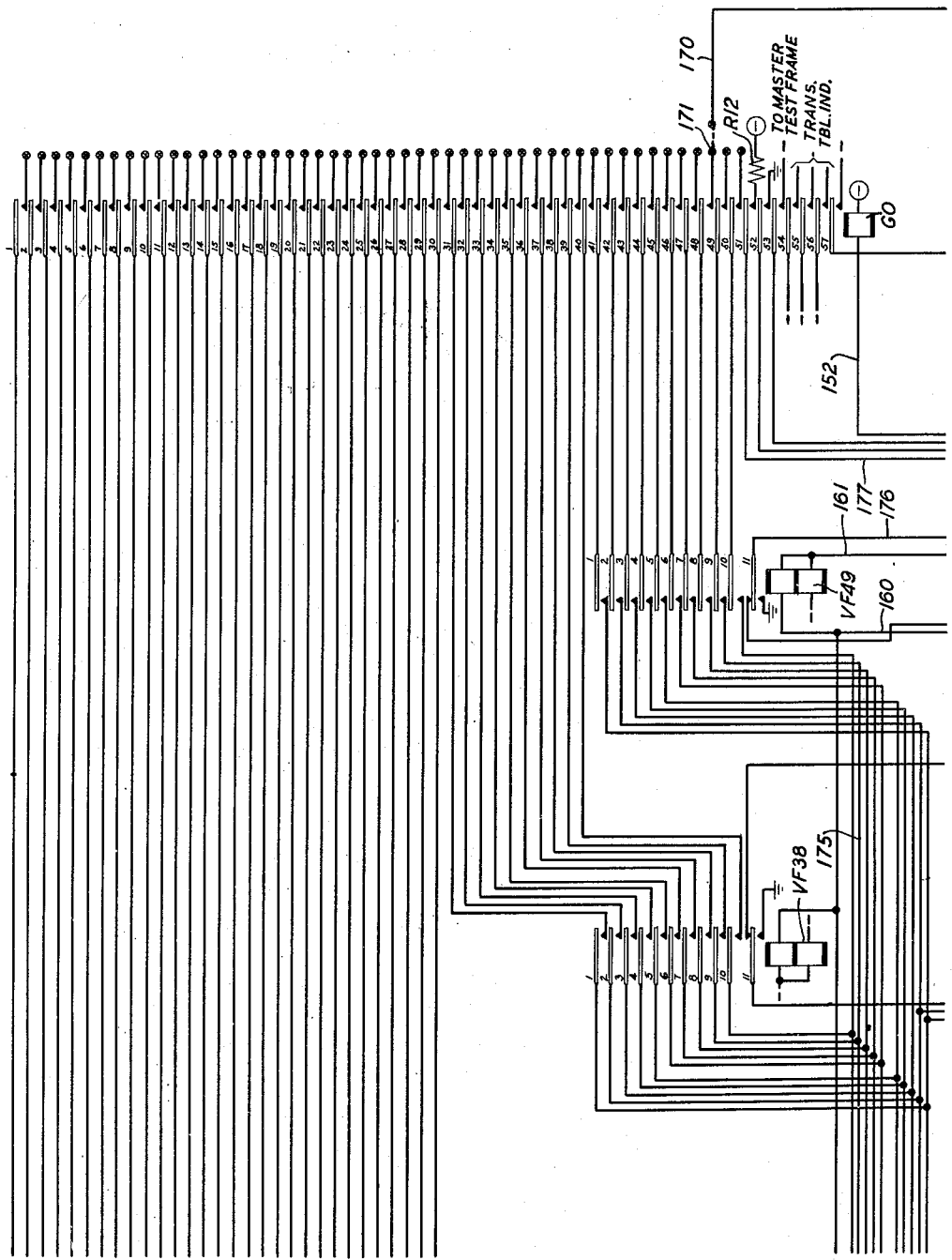
Figure 42:
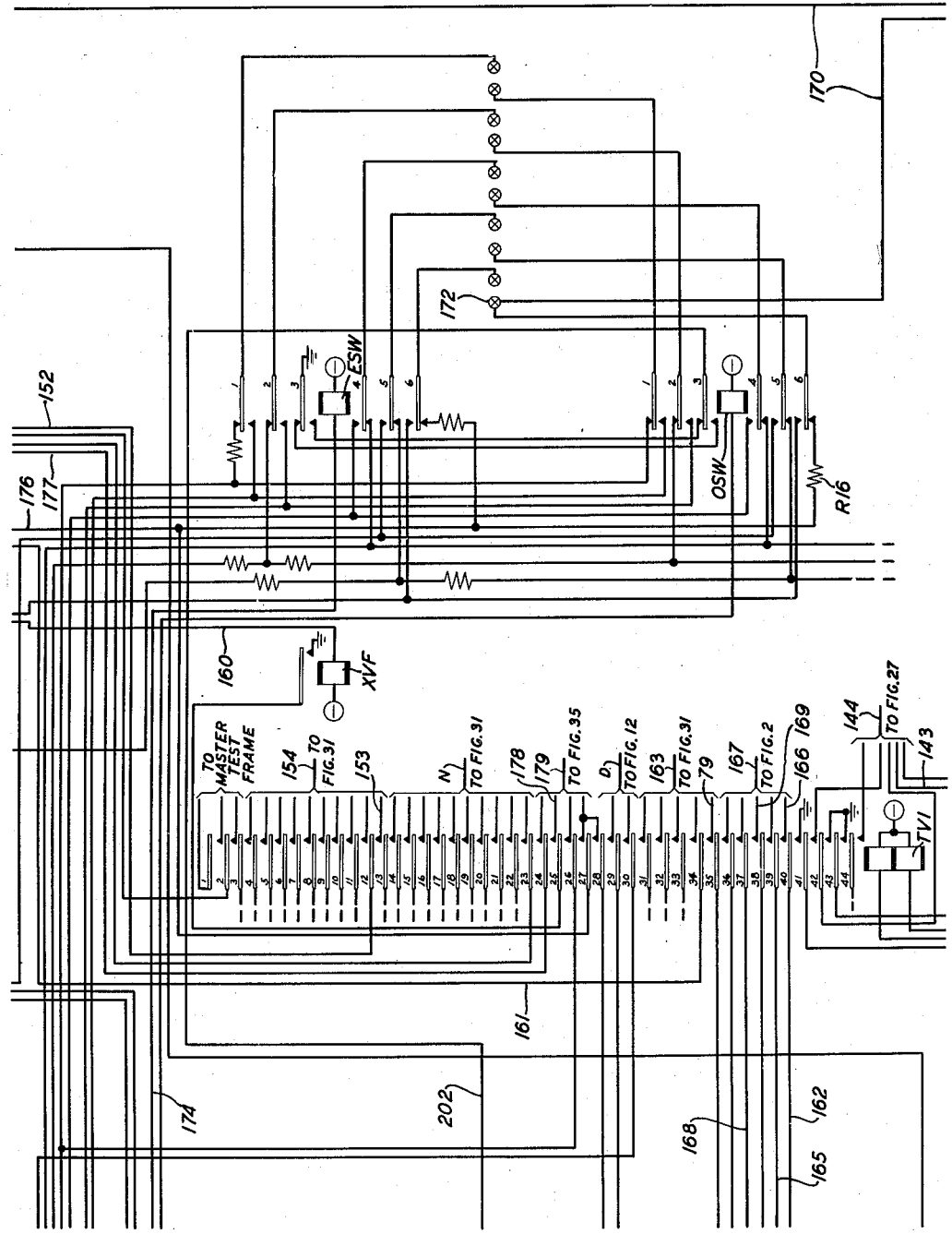
Figure 43:
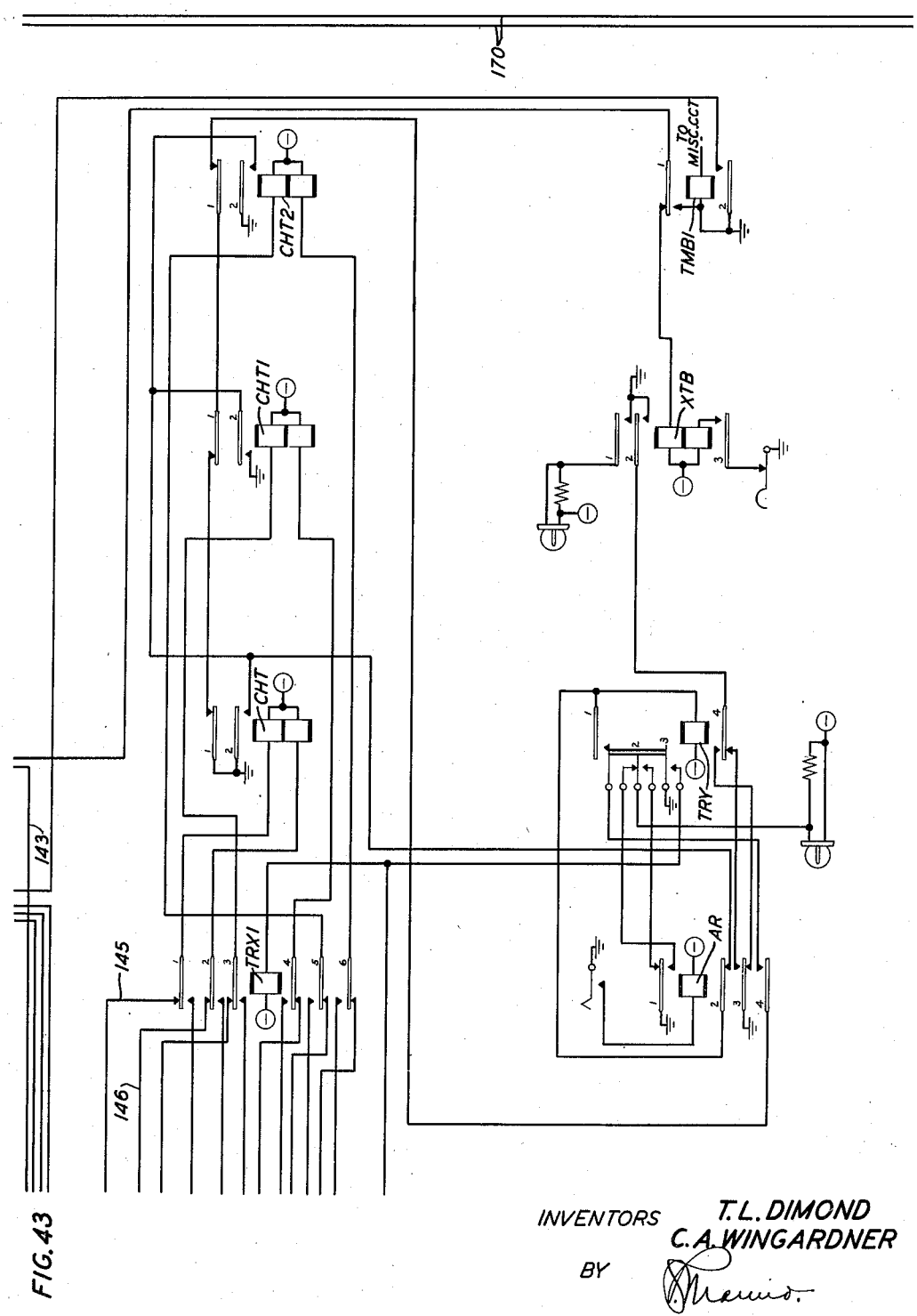
Figure 44:
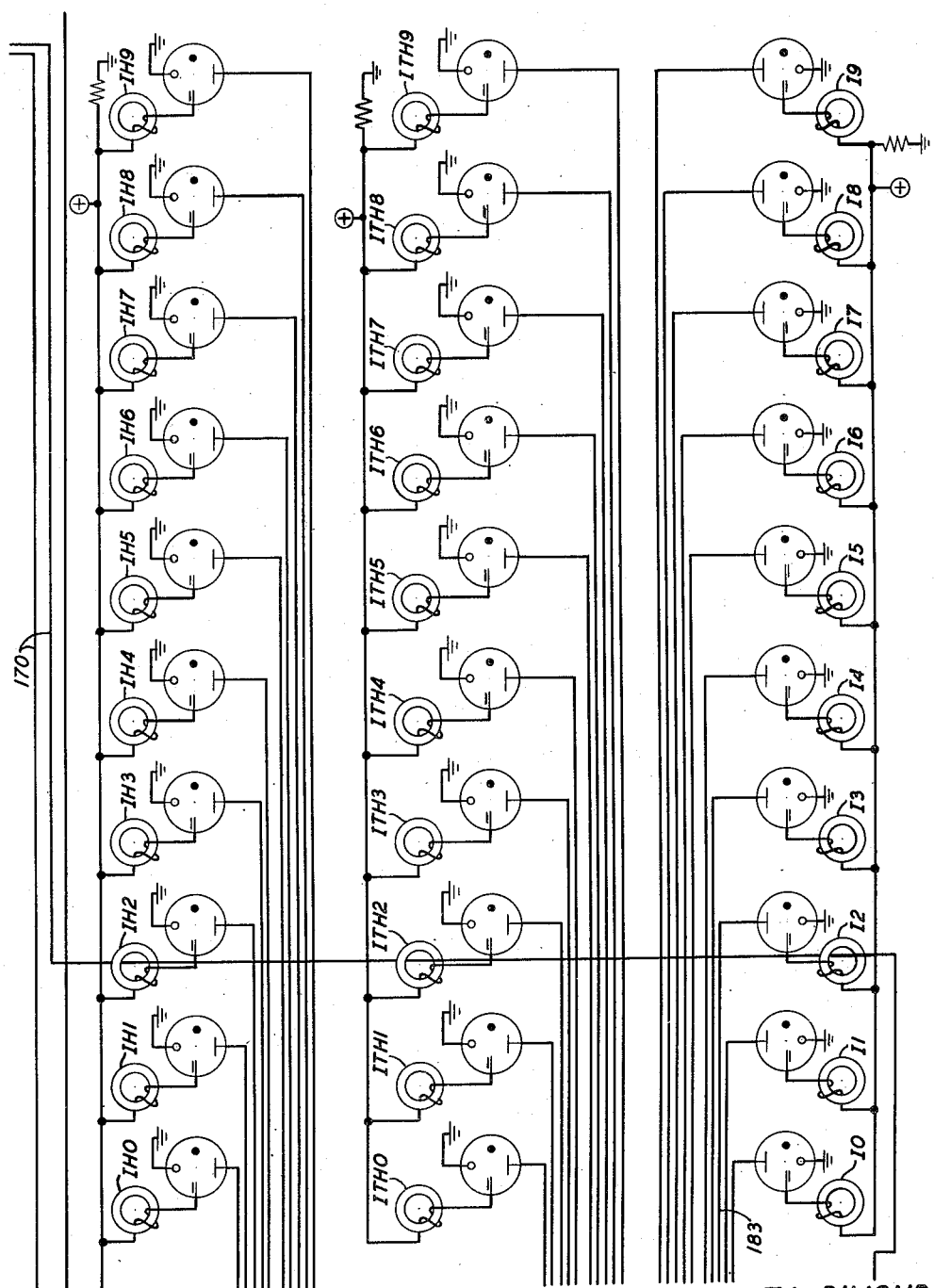
Figure 45:
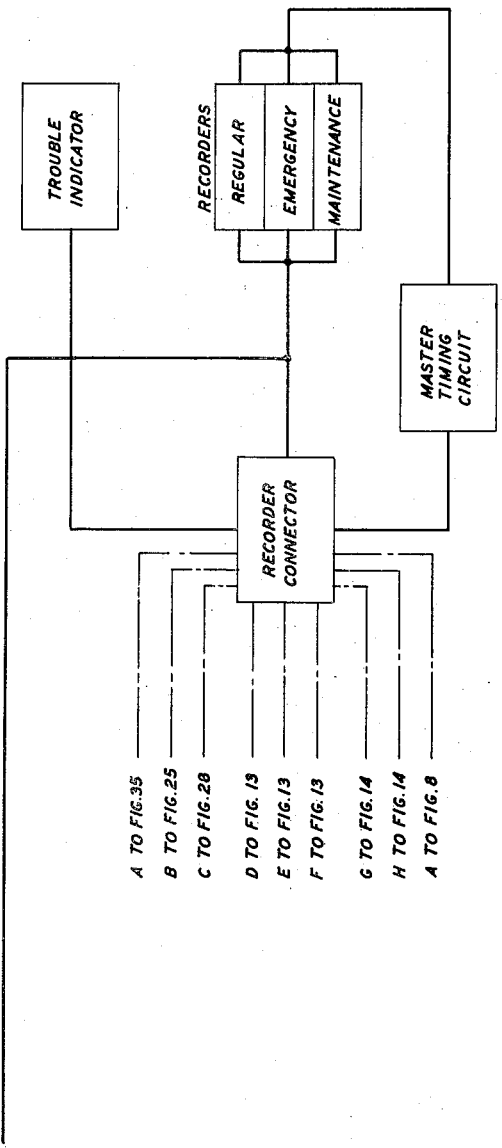
Fig. 45 shows, in diagrammatic form, the recording equipment.
Figure 46:
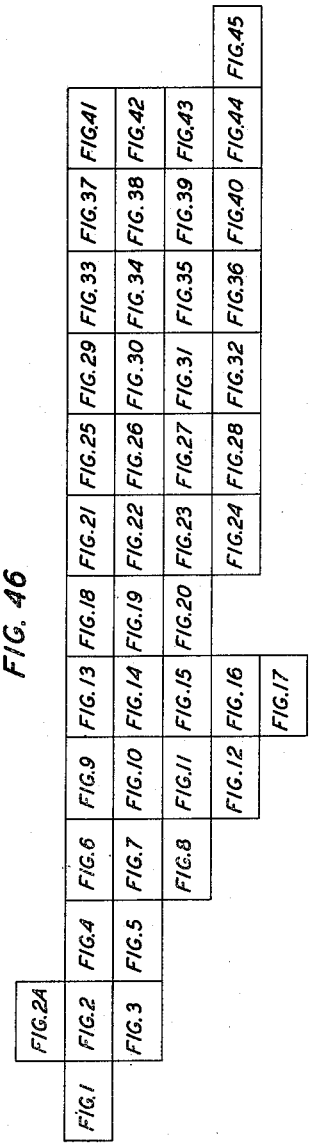
Fig. 46 shows how the above figures should be placed in relation to one another to disclose the invention.

We will illustrate the operation of the invention, therefore, by assuming that a call for which, if completed, a charge should be made (and, therefore, in connection with which a record should be made) has been originated at station S of Fig. 2A, that the data relating to said call have been registered in the sender, as described above, and that the transverter shown in Figs. 4 through 35 has been connected to said sender by the operation of relays SA, SB, TA and TB of Fig. 2 (relay CKG of Fig. 4 also operating). All of these operations are described in detail in the aforesaid copending application.

It will be further assumed, for the purpose of illustration, that station S is a ring-party station of office No. 2 having the directory number "2234," and that the line of station S terminates on vertical file No. 9 of switch No. 2 in column No. 135 of the line-link switches.

The above data relating to the character of station S and the location of its line are registered in the sender by the operation of register relays which ground corresponding conductors to the transverter, as described in the aforesaid copending application. In the present example, conductors 51 through 60 within bracket 50 (Fig. 2) are thus grounded and these grounds cause the operation of relays CH0, CH1, CT1 and CT2 (Fig. 34) and relays CU1, CU4, VF2 and VF7 (Fig. 30) to register in the transverter the three digits "135" of the column number and the vertical file number "9." Relay CH0, for example, operates over a circuit extending from battery through the winding of said relay, conductor 61 within bracket 62, and No. 30 contacts of relays TB and SB in series, to the ground on conductor 52. The other relays named operated over similar circuits.

It will be observed that each of relays CH0 .... CH7, CT0 .... CT7, CU0 .... CU7 and VF0 .... VF7 has a designation composed of letters indicative of the function of the relay, and a number. Relays with the designation CH are for registering the hundreds digit of the column number, relays with the designation CT are for registering the tens digit of the column number, relays with the designation CU are for registering the units digit of the column number, and relays with the designation VF are for registering the vertical file number. These relays are operated in combination of two to register digits. The relays operated to register the various digits are, in accordance with their number designations, as follows:

| Digit | Number Designation of Relays Operated |
| --- | --- |
| 1 | 0, 1 |
| 2 | 0, 2 |
| 3 | 1, 2 |
| 4 | 0, 4 |
| 5 | 1, 4 |
| 6 | 2, 4 |
| 7 | 0, 7 |
| 8 | 1, 7 |
| 9 | 2, 7 |
| 0 | 4, 7 |

It will be noted that, except for digit "0," the sum of the number designations of the two relays operated to register a digit is the digit registered. Operation of relays CH0 and CH1, therefore, registers the digit "1," operation of relays CT1 and CT2 registers the digit "3," etc. Similar designations and the same two-out-of-five code are used for other relays of the system and for the punches of the recorder, which records each digit by two impressions in the record medium spaced in accordance with said code.

The registration in the sender of the character of the calling station, previously mentioned, also grounds a conductor between the sender and the transverter indicative of said character. In the present case, the calling station S is a ring-party station and conductor 63 within bracket 70 is grounded in the sender. Relay RP (Fig. 11) then operates over a circuit extending from battery through the winding of said relay, conductor 64 within bracket 65, and No. 29 contacts of relays TA and SA in series, to said ground on conductor 63, registering in the transverter the character of station S. Relay RP is also operated when the calling station is the station of an individual line.

If the calling station were a tip-party station, conductor 66 would have been grounded in the sender and relay TP (Fig. 11) would have operated over a similar circuit to register in the transverter this characteristic of the calling station.

Before the register relays of the transverter operate, however, a check is made to ensure that the connections to them are not falsely grounded and that none of said relays are operated. The upper winding of relay XNL (Fig. 35) is normally connected over conductor 90, No. 3 back contacts of relay C09, and conductor 91 to contacts of all the register relays. If any of these contacts or the conductors to them are falsely grounded, relay XNL operates to said ground, actuating an alarm. When relay CKG operates, relay C09 operates over a circuit extending from battery through the winding of said relay, conductor 68 within bracket 69, and No. 5 contacts of relay CKG to ground, opening the circuit of relay XNL. If none of the register relays are operated, relay NOK (Fig. 4) operates over a circuit extending from battery through the winding of said relay, conductor 92 within bracket 82, No. 5 front contacts of relay C09, conductor 93, No. 4 back contacts of relays CU7 .... CU0, No. 6 back contacts of relay VF0, No. 7 back contacts of relay VF1 .... VF7, No. 4 contacts of relays CUA and CUB, conductor 95, No. 3 back contacts of relay CH7, No. 2 back contacts of relay CH4, No. 4 back contacts of relays CH2 and CH1, No. 3 back contacts of relay CH0, conductor 102, No. 6 back contacts of relay CT0, No. 7 back contacts of relay CT1 .... CT7, conductor 96 within bracket 75, No. 1 contacts of relay 25K, conductor 97, No. 2 back contacts of relays TH0 .... TH4, conductor 98, No. 2 back contacts of relays TH5 .... TH9, conductor 99, No. 1 back contacts of relays OFF0 .... OFF4, conductor 120, No. 1 back contacts of relays OFF5 .... OFF9, conductor 121, No. 5 contacts of relay TP, No. 5 contacts of relay RP, conductor 122, No. 2 back contacts of relays T0 .... T4, conductor 123, No. 2 back contacts of relays T6 .... T9, conductor 124, No. 1 back contacts of relays HN0 .... HN4, conductor 125, No. 1 back contacts of relays HN5 .... HN9, conductor 126, No. 1 back contacts of relays U9 .... U5, conductor 127, No. 1 back contacts of relays U4 .... U0, conductor 128, and No. 3 contacts of relay 25K to ground. Operation of relay NOK over this circuit checks that the register of the transverter is ready to register the location of the calling line, as described above.

The operation of relays CH0 and CH1 operates relay 1CH (Fig. 31) over a circuit extending from battery through the winding of said relay, conductor 67, No. 1 contacts of relay CH0, and No. 1 contacts of relay CH1 to ground. Ten relays, similar to relay 1CH, are provided, relay 1CH only being shown, and a different one of said relays is operated for each combination of two of relays CH0 ... CH7 operated, relay 1CH being the relay operated when relays CH0 and CH1 are operated.

The operation of two of relays CT0 ... CT7 operates one of the relays CT05 ... CT49 of Fig. 33 and one of the relays CTA and CTB. Relay CT05, for example, operates if the digit registered by relays CT0 ... CT7 is "0" or "5," relay CTA operating if said digit is "5" or above and relay CTB operating if said digit is below "5." In the present case, the digit registered by relays CT0 ... CT7 is "3" and relays CTB and CT38 operate over a circuit extending from battery through the winding of relay CTB, conductor 71, No. 8 contacts of relay CT2, No. 2 contacts of relay CT1, conductor 72, and the winding of relay CT38 to ground.

Similarly, the operation of two of relays CU0 ... CU7 operates one of the relays CU05 ... CU49 and relay CUA or relay CUB. In the present case, relays CU1 and CU4 are operated, registering the digit "5," and relays CUA and CU05 operate over a circuit extending from battery through the winding of relay CUA, conductor 72, No. 2 contacts of relay CU4, No. 3 contacts of relay CU1, conductor 73, and the winding of relay CU05 to ground.

A check is now made of the operated register relays of the transverter. Relay 25K (Fig. 15) operates over a circuit extending from battery through the winding of said relay, conductor 74 within bracket 75, No. 4 contacts of relay C09, conductor 100, No. 6 contacts of relay VF7, No. 6 back contacts of relay VF4, No. 7 front contacts of relay VF2, No. 7 back contacts of relay VF1, No. 6 back contacts of relay VF0, No. 4 back contacts of relay CU0, No. 6 front contacts of relay CU1, No. 7 front contacts of relay CU2, No. 7 back contacts of relay CU4, No. 6 back contacts of relay CU7, conductor 101, No. 4 back contacts of relay CT7, No. 4 back contacts of relay CT4, No. 6 front contacts of relay CT2, No. 7 front contacts of relay CT1, No. 6 back contacts of relay CT0, conductor 102, No. 5 contacts of relay CH0, No. 7 contacts of relay CH1, No. 7 back contacts of relay CH2, No. 5 back contacts of relay CH4, No. 5 back contacts of relay CH7, conductor 103, No. 1 contacts of relay CUB, conductor 104 within bracket 77, and No. 10 contacts of relay CK7 (which is operated) to ground. The operation of relay CK7 is described in the aforementioned copending application of W. W. Carpenter and R. E. Collis. This circuit is not closed unless exactly two of relays VF0 ... VF7, two of relays CU0 ... CU7, two of relays CT0 ... CT7, two of relays CH0 ... CH7, and either relay CUB or relay CUA are operated.

Relay GVF (Fig. 31) operates over a circuit extending from battery through the winding of said relay, No. 4 contacts of relay VED, conductor 76 within bracket 77, and No. 10 contacts of relay CK7 to ground. One of relays EV and OD now operates, relay EV operating if the digit registered by relays VF0 ... VF7 is even and relay OD operating if said digit is odd. In the present example, the digit registered by the operation of relays VF2 and VF7 is "9," and relay OD operates over a circuit extending from battery through the lower winding of said relay, No. 1 contacts of relay GVF, conductor 78, No. 3 contacts of relay VF7, No. 2 contacts of relay VF2, conductor 79, and No. 3 contacts of relay GVF to the above-traced ground on conductor 76, and locks up over a circuit extending from battery through its upper winding and No. 12 contacts to the same ground on conductor 76. Relay VE0 then operates over a circuit extending from battery through its winding, No. 1 and No. 12 contacts of relay OD to the same ground on conductor 76, opening the circuit of and releasing relay GVF.

The operation of relays 1CH, CTB, CUA and RP, described above, closes a circuit for the operation of relay A (Fig. 29) which is one of a number of such relays for connecting the transverter to translators. The circuit may be traced from battery through the winding of relay A, conductor 80, No. 6 contacts of relay 1CH, No. 4 contacts of relay CTB, No. 3 contacts of relay CUA, conductor 81 within bracket 82, and No. 4 contacts of relay RP to ground. Relay A closes through conductors from the transverter to translators for ring-party stations (determined by relay RP operated) whose lines are connected in columns 105 ... 149 (determined by relays 1CH, CTB, and CUA operated) of the line links. One of these translators is the translator shown in Figs. 36 through 44. Associated with each translator is a start relay, the start relay for the translator shown in Figs. 36 through 44 being relay ST in Fig. 27.

Relay ST now operates over a circuit extending from battery through the winding of relay XTS (Fig. 15), conductor 85 within bracket 86, the winding of relay ST, conductor 87, No. 28 contacts of relay A, No. 2 contacts of relay CU05, conductor 88, and No. 6 contacts of relay CT38 to ground. By the operation of relays CT38 and CU05, the start relay of the translator for ring-party stations or individual lines in column No. 135 of the line-link switches is thus operated and this translator is the one having a wire for station S, which is a ring-party station whose line is connected in column No. 135 of the line-link switches. It will be apparent that, with relay TP operated instead of relay RP, when the calling station is a tip-party station, the circuit of relay A is not closed and said relay is not operated, but a similar circuit is closed to operate another relay, similar to relay A, for connection to a translator for tip-party stations of lines in column No. 135.

Relay XTS does not operate over the above circuit, the current through its winding and the winding of relay ST being too small to operate it, but if the windings of two or more start relays are grounded, the increased current operates relay XTS to actuate an alarm.

Each of the relays TVP0 ... TVPX (Fig. 29) is associated with a different transverter, relay TVP0 being the relay associated with the transverter shown. This relay now operates unless another of said relays is operated, which would be the case if the translator were being used by another transverter. Assuming that none of said relays are operated, relay TVP0 operates over a circuit extending from battery through resistor R19 (Fig. 24), No. 5 contacts of relay TTR, conductor 110 within bracket 111, No. 8 contacts of relay PS, conductor 112, No. 1 contacts of relay DNK1 (which is operated), conductor 113 within bracket 75, No. 8 contacts of relay GVF, No. 1 contacts of relay VEO, conductor 142, No. 4 front contacts of relay ST, conductor 143 within bracket 144, No. 6 back contacts of relay TRP0, the winding of relay TVP0, and No. 3 normal contacts of relays TVP1 ... TVPX in series to ground, and locks up over the above circuit to ground at its No. 3 front contacts. Relay DNK1 is operated over a circuit extending from battery through the winding of said relay, No. 7 contacts of relay DNK, conductor 147, No. 3 contacts of relay OF1, No. 1 contacts of relay OF, conductor 148 within bracket 149, No. 3 contacts of relay TM3, No. 7 contacts of relay TM6, conductor 139 within brackets 149 and 138, and No. 13 contacts of relay CK8 to ground, when the latter relay operates as described in the aforementioned copending application of W. W. Carpenter and R. E. Collis.

The upper winding of relay CHT (Fig. 43) is normally connected through No. 1 back contacts of relay TRX1, conductor 145, and No. 3 normal contacts of relays TVP0 ... TVPX in series to ground, and the lower winding of relay CHT is normally connected through No. 2 back contacts of relay TRX1, conductor 146, and No. 1 back contacts of relays TVPX ... TVP0 in series to ground. The windings of relay CHT1 are similarly connected to ground, and the windings of relay CHT2 are connected in a similar manner with respect to relays E0 ... EX. Relays CHT, CHT1, and CHT2 are differential relays which do not operate when both windings are energized but only when one winding alone is energized. Each of them will operate to actuate an alarm if the circuit of one of its windings is opened by a faulty contact. Relay TVP0, in operating, opens the circuits of both windings of relays CHT and CHT1.

The connector relays TV0 (Fig. 40) and TV1 (Fig. 42) now operate to connect the selected translator to the transverter. Relay TV0 operates over a circuit extending from battery through the left-hand winding of said relay, conductor 150, No. 1 back contacts of relay TRP0, and No. 1 front contacts of relay TVP0 to ground, and also over a circuit extending from battery through its right-hand winding, conductor 151, No. 2 back contacts of relay TRP0, and No. 2 front contacts of relay TVP0 to ground. Relay TV1 operates over similar circuits through both of its windings. The double operating circuits of these relays ensure their operation even though a defective contact may be present.

Relay W1 operates over a circuit extending from battery through resistor R14, the winding and normal contacts of said relay, conductor 162, and No. 41 contacts of relay TV1 to ground, and locks up through its front contacts to ground.

The windings of relays SW0 ... SW7 (Fig. 38) are now connected through the transverter to the sender and two of said relays operate to register, in two-out-of-five code, the switch number registered in the sender. Relay SW0 operates over a circuit extending from battery through the upper winding of said relay, conductor 165, No. 47 contacts of relay TV1, conductor 166 within bracket 167, and No. 46 contacts of relays TB and SB in series, to the ground on conductor 59 within bracket 50. Relay SW2 operates over a circuit extending from battery through its upper winding, conductor 168, No. 45 contacts of relay TV1, conductor 169 within bracket 167, and No. 48 contacts of relays TB and SB in series, to the ground on conductor 60 within bracket 50.

Relay GO (Fig. 41) now operates over a circuit extending from battery through the winding of said relay, conductor 152, No. 12 contacts of relay TV1, conductor 153 within bracket 154, No. 2 contacts of relay OD, conductor 155 within bracket 156, No. 10 contacts of relay A, conductor 157, No. 5 contacts of relay CT38, conductor 158, No. 6 contacts of relay CU05, conductor 159 within bracket 75, No. 2 contacts of relay 25K, conductor 160 within bracket 161, and No. 1 contacts of relay P6 to ground.

Relay VG then operates over a circuit extending from battery through resistor R12 (Fig. 41), No. 51 contacts of relay GO, conductor 177, No. 24 contacts of relay TV1, conductor 178 within bracket 179, the winding of relay XG, and the winding of relay VG to ground. The current in this circuit is insufficient to operate relay XG. However, this relay will operate to actuate an alarm if one or more other relays similar to relay GO are operated at the same time as relay GO.

One of the relays FV05 ... FV49 (Figs. 37 and 41) now operates to register in the translator the vertical file number registered in the transverter. In the present case, relay FV49 operates over a circuit extending from battery through the winding of relay XVF, conductor 160, the upper winding of relay FV49, conductor 161, No. 38 contacts of relay TV1, conductor 79 within bracket 163, No. 2 contacts of relay VF2, No. 3 contacts of relay VF7, conductor 78, No. 2 contacts of relay VE0, No. 12 contacts of relay OD, conductor 76 within bracket 77, and No. 1 contacts of relay CK7 to ground. The current in this circuit is insufficient to operate relay XVF, but this relay will operate to actuate an alarm if the circuits of two or more relays FV04 ... FV49 are completed at once.

Each different combination of two of relays SW0 ... SW7 and one of relays FV05 ... FV49 operated directs an impulse, described later, to a different terminal, each terminal representing a particular vertical file of a particular switch. From each terminal, a wire is run and threaded through one coil in each of the groups of coils I0 ... I9, ITH0 ... ITH9, IH0 ... IH9, IT0 ... IT9, and IU0 ... IU9 in accordance with the office number and directory number of one of the stations on the line occupying the vertical file of the switch represented by said terminal. Since the translator shown is for ring-party stations, these wires are run in this translator in accordance with the directory numbers of ring-party stations. Each of the coils through which a wire is run represents a particular digit, the coils I0 ... I9 being for the office digit. The coils ITH0 ... ITH9, IH0 ... IH9, IT0 ... IT9, and IU0 ... IU9 are for the thousands, hundreds, tens and units digits of the directory number, respectively. The calling station S is on the line occupying vertical file No. 9 of switch No. 2, is in office No. 2, and has the directory number "2234." The wire 170 is, therefore, run from terminal 171 (to which the impulse, described later, will be directed by the operation of relays SW0, SW2, and FV49) through coils I2, ITH2, IH2, IT3, and IU4 to terminal 172.

The anode of the gas tube T10 (Fig. 38) is supplied with positive battery through No. 5 contacts of relay TV0, conductor 180, No. 1 contacts of relay Z1, and the winding of relay SST, while the cathode of said tube is connected to ground. The control element of said tube is positively biased by positive battery through resistor R17 but not sufficiently so to cause said tube to conduct. When relays SW0 and SW2 operate, as described above, relay ESW (Fig. 42) operates over a circuit extending from battery through the winding of said relay, conductor 174, No. 6 contacts of relay SW2, and No. 6 contacts of relay SW0 to ground. The negative battery through resistor R18 to capacitor C5 is then connected through back contacts of relay SST, No. 2 back contacts of relay Z1, No. 4 contacts of relay SW0, No. 8 contacts of relay SW2, conductor 175, No. 8 contacts of relay FV49, No. 48 contacts of relay GO, terminal 171, conductor 170, through the above-designated coils, terminal 172, No. 6 back contacts of relay OSW, resistor R16, conductor 176, and No. 11 contacts of relay FV49 to ground. Capacitor C5 thereupon partially discharges, raising the potential of the control element of tube T10 so that said tube conducts from positive battery through the winding of relay SST, and the anode-cathode space of said tube to ground, operating relay SST.

Capacitor C3 is normally charged by battery through inductor I10. When relay SST operates, said capacitor discharges, producing an impulse through No. 2 back contacts of relays T—NO and T—OP, front contacts of relay SST, No. 2 back contacts of relay Z1 and thence, over the circuit traced above to terminal 172 and through conductor 170 to ground. The discharge current through conductor 170 induces potential in the winding of each of the coils I2, ITH2, IH2, IT3, and IU4 through which said conductor passes; and these potentials which are applied to the control elements of the gas tubes associated with these coils, cause said gas tubes to conduct. The tube associated with coil I2, for example, conducts over a circuit extending from battery through the lower winding and No. 4 contacts of relay OFF2 (Fig. 18), conductor 181 within bracket 182, No. 45 contacts of relay TV0, conductor 183, and the anode-cathode space of said tube to ground, operating relay OFF2 and thereby registering in the transverter the number of the office in which the line of station S is located, each of relays OFF0 . . . OFF9 representing an office digit. Relays TH2 and HN2 (Fig. 19), T3 and U4 (Fig. 20) operate over similar circuits similarly registering the digits "2234" of the directory number of station S. These relays all lock up, relays OFF2, TH2, and HN2 locking up over a circuit extending from battery through No. 7 contacts of relay 25K, conductor 184, and the upper windings, and No. 7 contacts of said relays to ground, and relays T3 and U4 locking up over similar circuits through No. 8 contacts of relay 25K and conductor 185.

Relay DNK (Fig. 15) then operates over a circuit extending from battery through the upper winding of said relay, contacts of relay XTS, No. 3 contacts of relay OF, No. 2 contacts of relay OF1, No. 4 contacts of relay TOM, conductor 190 within bracket 191, No. 3 front contacts of relay C03, conductor 192, No. 2 back contacts of relays OFF9 . . . OFF5, conductor 193, No. 2 back contacts of relays OFF4 and OFF3, No. 1 front contacts of relay OFF2, No. 1 back contacts of relays OFF1 and OFF0, conductor 99, No. 2 back contacts of relays TH9 . . . TH5, conductor 98, No. 2 back contacts of relays TH4 and TH3, No. 1 front contacts of relay TH2, conductor 98, No. 1 back contacts of relays TH1 and TH0, conductor 194, No. 2 back contacts of relay HN9 . . . HN5, conductor 195, No. 2 back contacts of relays HN4 and HN3, No. 1 front contacts of relay HN2, No. 1 back contacts of relays HN1 and HN0, conductor 124, No. 2 back contacts of relays T9 . . . T5, conductor 123, No. 2 back contacts of relay T4, No. 1 front contacts of relay T3, No. 1 back contacts of relays T2 . . . T0, conductor 196, No. 2 back contacts of relays U9 . . . U5, conductor 197, No. 1 front contacts of relay U4, No. 1 back contacts of relays U3 . . . U0, conductor 128, No. 3 front contacts of relay 25K, No. 10 contacts of relay TK, conductor 198 within bracket 199, No. 2 contacts of relay VG, conductor 200, No. 4 contacts of relay TV0, conductor 201, No. 9 contacts of relay SW7, No. 3 contacts of relay SW4, No. 3 contacts of relay SW2, No. 3 contacts of relay SW1, No. 3 contacts of relay SW0, conductor 202, No. 3 back contacts of relay OSW, and No. 3 front contacts of relay ESW to ground. Operation of relay DNK over this circuit checks that the proper number of relays in the transverter for registering the office and directory number of station S are operated, and that the proper number of relays in the translator for registering the number of the switch on which the line of station S is located are operated. Relay DNK locks up through its No. 6 contacts, conductor 104 within brackets 75 and 77, and No. 10 contacts of relay CK7 to ground.

Relay 25K is now locked up over a circuit extending from battery through the winding and No. 4 contacts of said relay, and No. 1 contacts of relay DNK to ground.

Relay DNK, in operating, opens the circuit of and releases relay DNK1 which, in turn, releases relay TVP0. The connector relays TV0 and TV1 are thereby released, disconnecting the translator from the transverter, releasing the operated relays of the translator, except relay W1, and extinguishing tube T10. The opening of the No. 40 contacts of relay TV1 removes ground from resistor R15, and relay Z1 operates over a circuit extending from battery through resistor R15, the winding of relay Z1, and front contacts of relay W1 to ground. By the operation of relay Z1, the connection of conductor 180 is changed from tube T10 and relay SST to tube T11 and relay SST1, so that the latter tube and relay will be used to control the impulse when the translator is next used.

By the operations described above, the identification of the calling station S, registered in the sender as the location of the line of said station and the character of the station, has been translated to the office and directory number of said station, and these have been registered in the transverter. When the transverter then controls the recorder for recording, as described in the aforementioned copending application of W. W. Carpenter and R. E. Collis, a part of the information recorded is the office designation and the directory number of the calling station S obtained from said registration in the transverter and recorded in the same way that the numbers identifying the location of the calling line are recorded in the system described in said copending application.

We have illustrated our invention in one particular embodiment thereof but it will be apparent to those skilled in the art that it may be embodied in other forms. The terms and expressions which we have used to describe the invention are used as terms of description and not of limitation. We have no intention in the use of such terms and expressions of excluding thereby equivalents or modifications of the elements shown and described or parts thereof, but, on the contrary, intend to include therein any and all equivalents and modifications which may be employed without departing from the principles of the invention.

What is claimed is:

1. A call data recording telephone system comprising numbered switches arranged in numbered columns and having numbered contact groups, lines each connected to one of said contact groups and each having a distinguishing designation, means responsive to a call from any one of said lines, means responsive to said last-mentioned means for registering the number of the column, the number of the switch, and the number of the contact group of said switch to which said line is connected, an inductive translator responsive to said registering means for translating said registered numbers to the designation of said line, and means responsive to the operation of said inductive translator for recording said designation.

2. A call data recording telephone system comprising numbered switches arranged in numbered columns and having numbered contact groups, lines each connected to one of said contact groups and each having a plurality of stations thereon, each of said stations having a distinguishing designation, means responsive to a call from any one of said stations, means responsive to said last-mentioned means for registering the number of the column, the number of the switch, the number of the contact group of said switch to which the line of said station is connected, and an indication of the character of said station, an inductive translator responsive to said registering means for translating said registered numbers to the designation of said calling station, and means responsive to the operation of said inductive translator for recording said designation.

3. A call data recording telephone system comprising numbered switches arranged in numbered columns and having numbered contact groups, lines each connected to one of said contact groups and each having a distinguishing number, means responsive to a call from any one of said lines, means responsive to said last-mentioned means for registering the number of the column, the number of the switch, and the number of the contact group of said switch to which said calling line is connected, a plurality of numbered coils, wires threaded through said coils each in accordance with the number of one of said lines, means responsive to said registering means for selecting and energizing the wire corresponding to the number of said calling line, means responsive to the potentials induced in the coils through which said wire is threaded for registering the number of the calling line indicated thereby, and means responsive to said latter registering means for recording said number of said calling line.

4. A call data recording telephone system comprising numbered line switches arranged in numbered columns and having numbered contact groups, lines each connected to one of said contact groups and each having a plurality of stations thereon, each of said stations having a distinguishing number, means responsive to a call from any one of said stations, means responsive to said last-mentioned means for registering the number of the column, the number of the switch, and the number of the contact group to which the line of said station is connected, a plurality of number coils, wires threaded through said coils each in accordance with the number of one of said stations, means responsive to said registering means for selecting and energizing the wire corresponding to the number of said calling station, means responsive to the potentials induced in the coils through which said wire is threaded for registering the number of said calling station indicated thereby, and means responsive to said latter registering means for recording said number of said calling stations.

5. A call data recording telephone system comprising numbered switches arranged in numbered columns and having numbered contact groups, lines each connected to one of said contact groups and each having a distinguishing number, a first means responsive to a call from any one of said lines, means responsive to said last-mentioned means for registering the number of the contact group to which said calling line is connected and the number of the column in which the switch having said contact group is located, a plurality of inductive translators, means responsive to said first registering means for selecting one of said translators, a second registering means responsive to said call for registering the number of the contact group to which said calling line is connected and the number of the switch having said contact group, means responsive to said second registering means for selecting and energizing a wire in said selected translator, and a third means responsive to the energization of said wire for registering the number of said calling line indicated thereby.

6. A call data recording telephone system comprising numbered switches arranged in numbered columns and having numbered contact groups, lines each connected to one of said contact groups and each having a plurality of stations thereon, each of said stations having a distinguishing number, a first means responsive to a call from any one of said stations, means responsive to said last-mentioned means, for registering the number of the contact group to which the line of said station is connected, the number of the column of switches in which the switch having said contact group is located, and an indication of the character of said calling station, a plurality of inductive translators, means responsive to said first registering means for selecting one of said translators, a second means responsive to said call for registering the number of the contact group to which the line of said calling station is connected and the number of the switch having said contact group, means responsive to said second registering means for selecting and energizing a wire in said selected translator, and a third means responsive to the energization of said wire for registering the number of said calling station indicated thereby.

THOMAS L. DIMOND.
CHARLES A. WINGARDNER.

REFERENCES CITED

The following references are of record in the file of this patent:

UNITED STATES PATENTS

| Number | Name | Date |
|---|---|---|
| 2,252,766 | Holden | Aug. 19, 1941 |
| 2,265,844 | Korn | Dec. 9, 1941 |
| 2,289,939 | Stehlik | July 14, 1942 |
| 2,490,038 | Vriendt et al. | Dec. 6, 1949 |
| 2,510,061 | Branson et al. | June 6, 1950 |